US011038751B2

(12) United States Patent
Zheng

(10) Patent No.: US 11,038,751 B2
(45) Date of Patent: *Jun. 15, 2021

(54) INFORMATION PROCESSING METHOD, NETWORK NODE, AUTHENTICATION METHOD, AND SERVER

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,442

(22) Filed: Dec. 31, 2019

(65) Prior Publication Data
US 2020/0136903 A1 Apr. 30, 2020

Related U.S. Application Data

(63) Continuation of application No. 15/374,292, filed on Dec. 9, 2016, now Pat. No. 10,560,321, which is a
(Continued)

(30) Foreign Application Priority Data

Jun. 9, 2014 (CN) .......................... 201410253817.X
Sep. 25, 2014 (CN) .......................... 201410499583.7

(51) Int. Cl.
*H04L 29/06* (2006.01)
*H04L 12/24* (2006.01)
(Continued)

(52) U.S. Cl.
CPC ............ *H04L 41/0806* (2013.01); *H04L 9/32* (2013.01); *H04L 12/2885* (2013.01);
(Continued)

(58) Field of Classification Search
CPC .............. H04L 41/0806; H04L 12/885; H04L 2012/5605; H04L 41/0889; H04L 41/0809;
(Continued)

(56) References Cited

U.S. PATENT DOCUMENTS 7,305,350 B1   12/2007  Bruecken
8,639,783 B1 *  1/2014  Bakke ..................... H04L 49/70
                                                709/220
(Continued)

FOREIGN PATENT DOCUMENTS

CN       1697405 A    11/2005
CN     101034938 A     9/2007
(Continued)

OTHER PUBLICATIONS

Peng et al., English machine translation of CN 103024611 A, 12 pages, filed Dec. 28, 2012, published Apr. 3, 2013 (Year: 2013).*

*Primary Examiner* — Thaddeus J Plecha
(74) *Attorney, Agent, or Firm* — Slater Matsil, LLP

(57) ABSTRACT

The present embodiments relate to an information processing method, a network node, an authentication method, and a server. In one embodiment, a method includes generating a virtual access node corresponding to a first access node on a central node in response to determining that no virtual access node corresponding to the first access node currently exists on the central node; obtaining, by the virtual access node on the central node, configuration information related to the first access node; and sending, by the virtual access node to the first access node, the configuration information related to the first access node, after the first access node goes online.

17 Claims, 17 Drawing Sheets

Related U.S. Application Data continuation of application No. PCT/CN2015/079676, filed on May 25, 2015.

(51) Int. Cl.
| | | |
|---|---|---|
| *H04L 29/12* | (2006.01) | |
| *H04L 9/32* | (2006.01) | |
| *H04Q 11/00* | (2006.01) | |
| *H04L 12/28* | (2006.01) | |
| *H04L 29/08* | (2006.01) | |

(52) U.S. Cl.
CPC ........ *H04L 41/084* (2013.01); *H04L 41/0809* (2013.01); *H04L 61/2015* (2013.01); *H04L 63/0884* (2013.01); *H04L 63/0892* (2013.01); *H04L 67/141* (2013.01); *H04Q 11/0067* (2013.01); *H04L 41/0889* (2013.01)

(58) Field of Classification Search
CPC ............... H04L 41/084; H04L 12/2885; H04L 63/0884; H04L 63/0892; H04L 9/32; H04L 61/2015; H04L 67/141; H04Q 11/0001–0071; H04Q 2011/0007–0098
See application file for complete search history.

(56) References Cited

U.S. PATENT DOCUMENTS

| | | | |
|---|---|---|---|
| 10,560,321 B2 * | 2/2020 | Zheng | ................... H04L 9/32 |
| 2007/0025243 A1 | 2/2007 | Ayyagari et al. | |
| 2007/0174246 A1 | 7/2007 | Sigurdsson et al. | |
| 2007/0263656 A1 | 11/2007 | Niu et al. | |
| 2008/0232801 A1 | 9/2008 | Arnold et al. | |
| 2008/0298809 A1 | 12/2008 | Zheng | |
| 2009/0213763 A1 | 8/2009 | Dunsmore et al. | |
| 2010/0054120 A1 | 3/2010 | Beeken et al. | |
| 2010/0064032 A1 | 3/2010 | Vinel et al. | |
| 2010/0169467 A1 | 7/2010 | Shukla et al. | |
| 2012/0251113 A1 | 10/2012 | Hajduczenia et al. | |
| 2013/0343755 A1 | 12/2013 | Cvijetic et al. | |
| 2014/0023366 A1 | 1/2014 | Zang et al. | |
| 2014/0122674 A1 * | 5/2014 | Gray | ................... H04L 67/26 |
| | | | 709/222 |
| 2014/0130041 A1 | 5/2014 | Luxenberg et al. | |
| 2014/0214922 A1 | 7/2014 | Kim et al. | |
| 2014/0245405 A1 | 8/2014 | Ye et al. | |
| 2014/0334822 A1 | 11/2014 | Hajduczenia et al. | |
| 2014/0373116 A1 | 12/2014 | Hajduczenia | |
| 2015/0049636 A1 * | 2/2015 | Tai | ................... H04L 43/0817 |
| | | | 370/254 |
| 2016/0261337 A1 | 9/2016 | Mukai et al. | |

FOREIGN PATENT DOCUMENTS

| | | |
|---|---|---|
| CN | 101068145 A | 11/2007 |
| CN | 101227236 A | 7/2008 |
| CN | 101639694 A | 2/2010 |
| CN | 101674501 A | 3/2010 |
| CN | 101997725 A | 3/2011 |
| CN | 102970071 A | 3/2013 |
| CN | 103024611 A | 4/2013 |
| CN | 103763148 A | 4/2014 |
| WO | 2013067884 A1 | 5/2013 |

\* cited by examiner

INFORMATION PROCESSING METHOD, NETWORK NODE, AUTHENTICATION METHOD, AND SERVER

CROSS-REFERENCE TO RELATED APPLICATIONS

This application is a continuation of U.S. patent application Ser. No. 15/374,292, filed on Dec. 9, 2016, which is a continuation of International Application No. PCT/CN2015/079676, filed on May 25, 2015, which claims priority to Chinese Patent Application No. 201410253817.X, filed on Jun. 9, 2014, and Chinese Patent Application No. 201410499583.7, filed on Sep. 25, 2014. All of the aforementioned patent applications are hereby incorporated by reference in their entireties.

TECHNICAL FIELD

The present embodiments relate to the field of communications technologies, and in particular, to an information processing method, a network node, an authentication method, and a server.

BACKGROUND

FIG. 1 shows a network architecture of a common optical access network. The optical access network includes: a passive optical access network, for example, fiber to the x (FTTX); and an active access network. For example, a digital subscriber line access multiplexer (DSLAM) is connected to an optical line termination (OLT) by using an Ethernet (ETH).

FTTX is classified into fiber to the home (FTTH), fiber to the drop/distribution point (FTTDp), fiber to the building (FTTB), fiber to the curb (FTTC), and so on according to a location of an optical network unit (ONU).

Currently, a passive optical network (PON) technology is mainly used on an optical access network. At present, mature mainstream technologies mainly include an Ethernet passive optical network (EPON) and a gigabit passive optical network (GPON). A PON is a point-to-multipoint OAN technology, and includes an OLT, an ONU/optical network terminal (ONT), and an optical distribution network (ODN). Except for the FTTH, the last segment to the home that is connected to the PON is connected by using a drop copper cable (such as a phone twisted-pair cable, a wired television cable, an electrical power cable, or an Ethernet cable) or a radio interface as much as possible. A multi-x unit (MxU) (which refers to a multi-dwelling unit (MDU), a multi-tenant unit (MTU), or the like) is an ONU (which is usually frame-shaped equipment) in scenarios such as FTB/FITC, and a drop point unit (DPU) is an ONU (which is usually a small access box) in an FTTDp scenario. In addition, when the PON is applied to a hybrid fiber coaxial (HFC) network or a network related to the Data-over-Cable Service Interface Specification (DOCSIS). The ONU may be a cable modem terminal system (CMTS), a cable media converter (CMC), a converged cable access platform (CCAP) device, or the like. In FIG. 1, a customer premises equipment (CPE) may be connected to a DPU in a wired/wireless manner, or may be connected to an MxU or a digital subscriber line access multiplexer (DSLAM) by using a digital subscriber line (DSL), to access an optical network.

Existing access network devices such as an MxU, a DSLAM, a CMTS, and a CCAP all have a large size. However, as technologies develop, access network devices are developing toward miniaturization, and a large quantity of cable modems (CM), DPUs, ONTs, miniaturized MxUs/DSLAMs, miniaturized CMCs/CMTSs/CCAPs, and the like will be used. A quantity of such access network devices, serving as remote access nodes on an optical access network, increases hundredfold or thousandfold, and a quantity of ONTs/DPUs is even of the same order of magnitude as that of home gateways. According to an existing method, each remote access node needs to be manually configured before accessing a network. Therefore, presence of a large quantity of remote access nodes increases device management complexity.

Moreover, on a communications network, authentication is usually performed on an identity of a device user. However, this cannot prevent an invalid node from accessing the communications network. Consequently, there may be a large quantity of invalid nodes on the communications network.

SUMMARY

Embodiments provide an information processing method and a network node, so as to reduce complexity in managing remote access nodes on a communications network if there is a large quantity of remote access nodes on the communications network.

The embodiments further provide an authentication method and a server, so as to prevent an invalid node from accessing a communications network.

According to a first aspect, an embodiment provides an information processing method, includes receiving, by a central node, a go-online notification indicating that a first access node goes online and obtaining, by a virtual access node on the central node, configuration information of the first access node after the central node receives the go-online notification. The method also includes, after the first access node goes online, sending, by the virtual access node, the configuration information related to the first access node to the first access node.

Optionally, wherein the determining, by a central node, that a first access node goes online comprises: if the first access node is already powered on, determining, by the central node, that the first access node goes online.

Optionally, wherein the configuration information related to the first access node is configuration information of the first access node.

Optionally, wherein the determining, by a central node, that a first access node goes online comprises: if the first access node comprises a first user-side port, and a communication connection is established between the first access node and the virtual access node, determining, by the central node, that the first access node goes online.

Optionally, wherein the configuration information related to the first access node is configuration information of the first user-side port.

With reference to the first aspect, in a first possible implementation manner, the obtaining, by a virtual access node, configuration information of the first access node includes: determining file information of a configuration file that includes the configuration information; sending a first Internet Protocol (IP) packet used to request the configuration information, where a source IP address of the first IP packet is a management IP address of the virtual access node, and a destination IP address of the first IP packet is an IP address determined according to the file information; receiving a second IP packet that carries the configuration information, where the second IP packet is a response packet of the first IP packet; and obtaining the configuration information from the second IP packet.

With reference to the first possible implementation manner of the first aspect, in a second possible implementation manner, the determining file information of a configuration file that includes the configuration information includes: receiving a Dynamic Host Configuration Protocol (DHCP) message that carries the file information; and determining the file information of the configuration file according to the DHCP message.

With reference to the second possible implementation manner of the first aspect, in a third possible implementation manner, the file information in the DHCP message is inserted into the DHCP message by a DHCP server; or the file information in the DHCP message is inserted into the DHCP message by an intermediate network device between an authentication, authorization and accounting (AAA) server and the central node.

With reference to the first aspect, the first possible implementation manner of the first aspect, the second possible implementation manner of the first aspect, or the third possible implementation manner of the first aspect, in a fourth possible implementation manner, the file information includes an IP address of a configuration server and an identifier of the configuration file, the configuration server is a server that provides the configuration information, the destination IP address of the first IP packet is the IP address of the configuration server, and the first IP packet further includes the identifier of the configuration file.

Optionally, the file information includes an IP address of a configuration server, an identifier of the configuration file, and an identifier of the configuration information, the configuration server is a server that provides the configuration information, the destination IP address of the first IP packet is the IP address of the configuration server, and the first IP packet further includes the identifier of the configuration file and the identifier of the configuration information.

Optionally, the file information includes a uniform resource identifier (URI) of the configuration file, the destination IP address of the first IP packet is an IP address determined according to the URI, and the first IP packet further includes a storage path that is of the configuration file and that is determined according to the URI.

With reference to the first aspect, in a fifth possible implementation manner, the obtaining, by a virtual access node, configuration information of the first access node includes: sending, to a configuration server, a configuration information request message that includes an identifier of the first access node or includes an identifier of the virtual access node; and receiving the configuration information of the first access node that is sent by the configuration server, where the configuration server is a server that provides the configuration information.

Optionally, wherein the central node determines, according to a received go-online notification, that the first access node goes online.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the go-online notification is sent to the central node based on a first protocol, the configuration information is sent by the virtual access node to the first access node based on the first protocol, and the first protocol includes a physical layer protocol, a data link layer protocol, or an IP layer protocol.

With reference to the sixth possible implementation manner of the first aspect, in a seventh possible implementation manner, a first format of the configuration information obtained by the virtual access node conforms to a requirement of the IP layer protocol or conforms to a requirement of a protocol of a layer that is higher than an IP layer in an Open System Interconnection (OSI) model; and the sending, by the virtual access node, the configuration information to the first access node includes: converting the first format of the configuration information obtained by the virtual access node to a second format that conforms to a requirement of the first protocol; and sending, to the first access node, the configuration information that is in the second format.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner, after the receiving, by a central node, a go-online notification, and before the obtaining, by a virtual access node, configuration information related to the first access node, the method further includes: establishing the virtual access node; or determining the virtual access node in at least one virtual access node established on the central node in advance.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, before the sending, by the virtual access node, the configuration information to the first access node, the method further includes: sending, by the virtual access node, an authentication request for the first access node to an authentication server; and receiving, by the virtual access node, an authentication response indicating that the first access node is a legal node.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner, the configuration information includes a forwarding table entry.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner, the central node stores a correspondence between the virtual access node and an access node group, the access node group includes the first access node, and the first access node and the central node are different physical devices.

In the information processing method provided by the first aspect, after receiving a go-online notification indicating that a first access node goes online, a central node obtains configuration information of the first access node, and sends the obtained configuration information to the first access node. In this way, after receiving the configuration information, the first access node can run after performing configuration according to the configuration information. This implements plug-and-play of the first access node, and the first access node does not need to be manually configured before accessing a network, thereby reducing device management complexity of the first access node.

According to a second aspect, an embodiment provides another information processing method, including when a first access node is powered on or accesses a network, sending, by the first access node to a central node on the network, a go-online notification indicating that the first access node goes online. The method also includes receiving, by the first access node, configuration information that is returned by the central node in response to the go-online notification and performing, by the first access node before running, self-configuration according to the received configuration information.

With reference to the second aspect, in a first possible implementation manner, the go-online notification is sent to the central node based on a first protocol, the configuration information is sent by the central node to the first access node based on the first protocol, and the first protocol includes a physical layer protocol, a data link layer protocol, or an IP layer protocol.

With reference to the second aspect or the first possible implementation manner of the second aspect, in a second possible implementation manner, the configuration information includes a forwarding table entry.

With reference to the second aspect, the first possible implementation manner of the second aspect, or the second possible implementation manner of the second aspect, in a third possible implementation manner, the first access node and the central node are different physical devices.

In the information processing method provided by the second aspect, when a first access node is powered on or accesses a network, the first access node sends, to a central node on the network, a go-online notification indicating that the first access node goes online, and before running, the first access node performs self-configuration according to the configuration information received from the central node. This implements plug-and-play of the first access node, and the first access node does not need to be manually configured before accessing a network, thereby reducing device management complexity of the first access node.

According to a third aspect, an embodiment provides a network node, including: a determining unit and at least one virtual access node, where the determining unit is configured to determine that a first access node goes online; and the virtual access node is configured to: obtain configuration information related to the first access node, and after the first access node goes online, send the configuration information related to the first access node to the first access node.

Optionally, wherein the determining unit is configured to: when the first access node is already powered on, determine that the first access node goes online.

Optionally, wherein the configuration information related to the first access node comprises configuration information of the first access node.

Optionally, wherein the determining unit is configured to: if it is determined that the first access node comprises a first user-side port and that a communication connection is established between the first access node and the virtual access node, determine that the first access node goes online.

Optionally, wherein the configuration information related to the first access node comprises configuration information of the first user-side port.

With reference to the third aspect, in a first possible implementation manner, the virtual access node is specifically configured to: determine file information of a configuration file that includes the configuration information; send a first IP packet used to request the configuration information, where a source IP address of the first IP packet is a management IP address of the virtual access node, and a destination IP address of the first IP packet is an IP address determined according to the file information; receive a second IP packet that carries the configuration information, where the second IP packet is a response packet of the first IP packet; and obtain the configuration information from the second IP packet.

With reference to the first possible implementation manner of the third aspect, in a second possible implementation manner, the virtual access node is specifically configured to: receive a DHCP message that carries the file information; and determine the file information of the configuration file according to the DHCP message.

With reference to the second possible implementation manner of the third aspect, in a third possible implementation manner, the file information in the DHCP message is inserted into the DHCP message by a DHCP server; or the file information in the DHCP message is inserted into the DHCP message by an intermediate network device between an AAA server and the network node.

With reference to the third aspect, the first possible implementation manner of the third aspect, the second possible implementation manner of the third aspect, or the third possible implementation manner of the third aspect, in a fourth possible implementation manner, the file information includes an IP address of a configuration server and an identifier of the configuration file, the configuration server is a server that provides the configuration information, the destination IP address of the first IP packet is the IP address of the configuration server, and the first IP packet further includes the identifier of the configuration file; or the file information includes an IP address of a configuration server, an identifier of the configuration file, and an identifier of the configuration information, the configuration server is a server that provides the configuration information, the destination IP address of the first IP packet is the IP address of the configuration server, and the first IP packet further includes the identifier of the configuration file and the identifier of the configuration information; or the file information includes a URI of the configuration file, the destination IP address of the first IP packet is an IP address determined according to the URI, and the first IP packet further includes a storage path that is of the configuration file and that is determined according to the URI.

With reference to the third aspect, in a fifth possible implementation manner, the virtual access node is specifically configured to: send, to a configuration server, a configuration information request message that includes an identifier of the first access node or includes an identifier of the virtual access node; and receive the configuration information of the first access node that is sent by the configuration server, where the configuration server is a server that provides the configuration information.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, the go-online notification is sent to the network node based on a first protocol, the configuration information is sent by the virtual access node to the first access node based on the first protocol, and the first protocol includes a physical layer protocol, a data link layer protocol, or an IP layer protocol.

With reference to the sixth possible implementation manner of the third aspect, in a seventh possible implementation manner, a first format of the configuration information obtained by the virtual access node conforms to a requirement of the IP layer protocol or conforms to a requirement of a protocol of a layer that is higher than an IP layer in an OSI model; and the virtual access node is specifically configured to: convert the first format of the configuration information obtained by the virtual access node to a second format that conforms to a requirement of the first protocol; and send, to the first access node, the configuration information that is in the second format.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, or the seventh possible implementation manner of the third aspect, in an eighth possible implementation manner, the determining unit is further configured to: establish the virtual access node for the first access node; or determine the virtual access node corresponding to the first access node in at least one virtual access node established on the network node in advance.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner, the virtual access node is further configured to: before sending the configuration information to the first access node, send an authentication request for the first access node to an authentication server, and receive an authentication response indicating that the first access node is a legal node.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, or the ninth possible implementation manner of the third aspect, in a tenth possible implementation manner, the configuration information includes a forwarding table entry.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, or the tenth possible implementation manner of the third aspect, in an eleventh possible implementation manner, the network node stores a correspondence between the virtual access node and an access node group, the access node group includes the first access node, and the first access node and the network node are different physical devices.

After receiving a go-online notification indicating that a first access node goes online, the network node provided by the third aspect obtains configuration information of the first access node, and sends the obtained configuration information to the first access node. In this way, after receiving the configuration information, the first access node can run after performing configuration according to the configuration information. This implements plug-and-play of the first access node, and the first access node does not need to be manually configured before accessing a network, thereby reducing device management complexity of the first access node.

According to a fourth aspect, an embodiment provides another network node, including: a transceiver unit, configured to: when the network node is powered on or accesses a network, send, to a central node on the network, a go-online notification indicating that the network node goes online; and receive configuration information that is returned by the central node in response to the go-online notification; and a processing unit, configured to configure the network node according to the configuration information received by the transceiver unit.

With reference to the fourth aspect, in a first possible implementation manner, the go-online notification is sent to the central node based on a first protocol, the configuration information is sent by the central node to the network node based on the first protocol, and the first protocol includes a physical layer protocol, a data link layer protocol, or an IP layer protocol.

With reference to the fourth aspect or the first possible implementation manner of the fourth aspect, in a second possible implementation manner, the configuration information includes a forwarding table entry.

With reference to the fourth aspect, the first possible implementation manner of the fourth aspect, or the second possible implementation manner of the fourth aspect, in a third possible implementation manner, the network node and the central node are different physical devices.

Optionally, wherein the network node further comprises a determining unit, and the determining unit is configured to: if it is determined that the network node is connected to a virtual access node established on the central node, determine that the network node accesses the network; or if it is determined that the network node comprises a first user-side port, and that the network node is connected to a virtual access node established on the central node, determine that the network node accesses the network.

When being powered on or accessing a network, the network node provided by the fourth aspect sends, to a central node on the network, a go-online notification indicating that the network node goes online, and before running, the network node performs self-configuration according to configuration information received from the central node. This implements plug-and-play of the network node, and the network node does not need to be manually configured before accessing a network, thereby reducing device management complexity of the network node.

According to a fifth aspect, an embodiment provides an authentication method, including: performing, by an authentication server after receiving an authentication request that requests to perform authentication on whether a particular node is a legal node, authentication on whether the particular node is a legal node; and sending, by the authentication server, an authentication response indicating that the particular node is a legal node, after determining that the particular node is a legal node.

With reference to the fifth aspect, in a first possible implementation manner, before the sending, by the authentication server, an authentication response after determining that the particular node is a legal node, the method further includes: determining, by the authentication server, file information of a configuration file that includes configuration information of the particular node; and the sending, by the authentication server, an authentication response includes: sending, by the authentication server, the file information by using the authentication response.

With reference to the first possible implementation manner of the fifth aspect, in a second possible implementation manner, the authentication request includes a node identifier of the particular node, and the performing, by an authentication server, authentication on whether the particular node is a legal node includes: determining, by the authentication server, whether a node corresponding to the node identifier is a legal node; or the authentication request includes a node identifier of the particular node and a port identifier of a port by using which the particular node is connected to an upper-level node, and the performing, by an authentication server, authentication on whether the particular node is a legal node includes: determining, by the authentication server, whether a node corresponding to an identifier combination of the node identifier and the port identifier of the port is a legal node.

In the authentication method provided by the fifth aspect, authentication is performed on a node device on a communications network, thereby preventing an invalid node from accessing the communications network.

According to a sixth aspect, an embodiment provides an authentication server, including: a transceiver module, configured to receive an authentication request that requests to perform authentication on whether a particular node is a legal node; and a processing module, configured to determine whether the particular node is a legal node, where the transceiver module is further configured to: after the processing module determines that the particular node is a legal node, send an authentication response indicating that the particular node is a legal node.

With reference to the sixth aspect, in a first possible implementation manner, the processing module is further configured to determine file information of a configuration file that includes configuration information of the particular node; and the transceiver module is further configured to send the file information by using the authentication response.

With reference to the first possible implementation manner of the sixth aspect, in a second possible implementation manner, the authentication request includes a node identifier of the particular node, and the processing module is specifically configured to determine whether a node corresponding to the node identifier is a legal node; or the authentication request includes a node identifier of the particular node and a port identifier of a port by using which the particular node is connected to an upper-level node, and the processing module is specifically configured to determine whether a node corresponding to an identifier combination of the node identifier and the port identifier of the port is a legal node.

The authentication server provided by the sixth aspect can perform authentication on a node device on a communications network, thereby preventing an invalid node from accessing the communications network.

DETAILED DESCRIPTION OF ILLUSTRATIVE EMBODIMENTS

Figure 1:
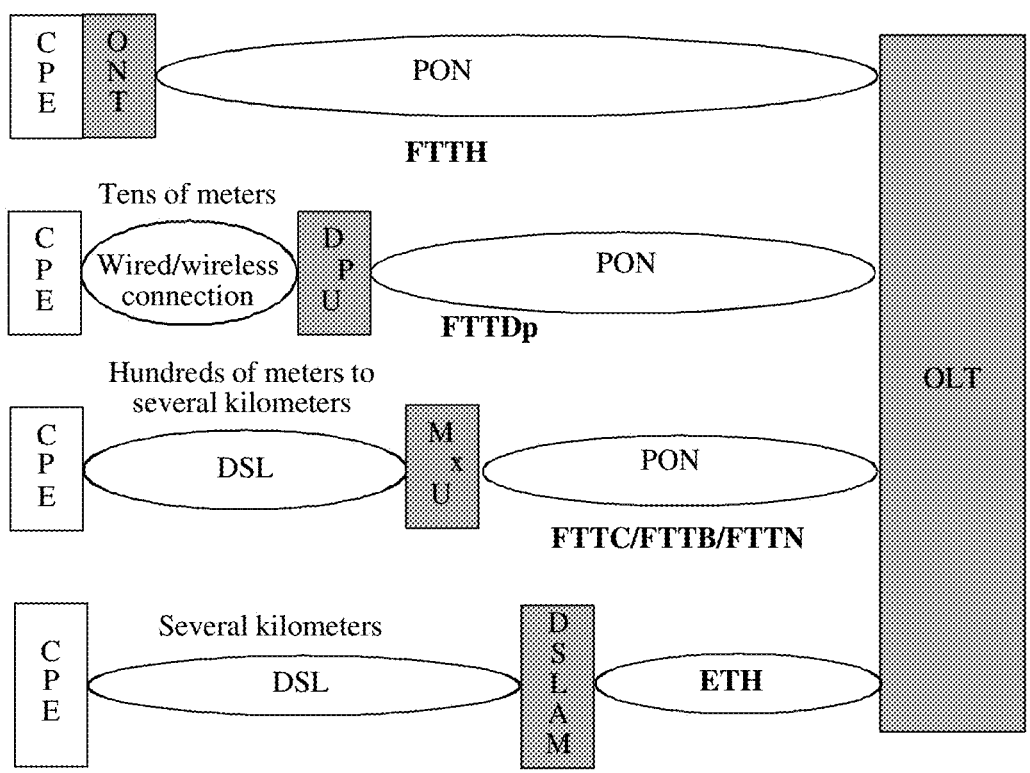
FIG. 1 is a diagram of a network architecture of a common optical access network.

Embodiments provide an information processing method and a network node, so as to reduce complexity in managing remote access nodes on a communications network if there is a large quantity of remote access nodes on the communications network.

An information processing method provided in an embodiment.

2201. A central node determines that a first access node goes online.

2202. A virtual access node on the central node obtains configuration information related to the first access node.

2203. The virtual access node sends the configuration information related to the first access node to the first access node after the first access node goes online.

The configuration information related to the first access node may be configuration information of the first access node, or may be configuration information of a first user-side port on the first access node.

When the first access node includes the first user-side port, the configuration information of the first user-side port may be a type of configuration information of the first access node. However, in some cases, the first access node has no user-side port. In such cases, the configuration information of the first access node may not include configuration information of a user-side port. The configuration information of the first user-side port may be a bandwidth or a physical layer parameter such as an interleave depth, or may be other information.

The central node may determine, in multiple manners, the first access node goes online. For example, if the central node receives a go-online notification indicating that the first access node goes online, the central node determines that the first access node goes online. The go-online notification may be actively sent by the first access node or another network device to the central node, or may be a response returned by the first access node or another network device after receiving a go-online detection request of the central node. There may be many specific representation forms for the go-online notification, and any message or packet that can indicate that the first access node goes online may be used as the go-online notification.

There may be multiple criteria for determining that the first access node goes online. For example, a first criterion may be: if the first access node is already powered on, determining that the first access node goes online. A second criterion may be: if the first access node includes the first user-side port, and a communication connection is established between the first access node and the virtual access node, determining that the first access node goes online.

It should be noted that, the first access node may not include a user-side port. The first criterion is applicable to a case in which the first access node includes no user-side port, and the second criterion is applicable to a case in which the first access node includes a user-side port.

Information carried in the go-online notification may be information indicating that the first access node is already powered on, or may be information indicating that the first access node includes the first user-side port and that a communication connection is established between the first access node and the virtual access node.

When the first criterion is used, the configuration information related to the first access node may be the configuration information of the first access node; when the second criterion is used, the configuration information related to the first access node may be the configuration information of the first user-side port.

The information processing method provided in this embodiment includes: receiving, by a central node, a go-online notification indicating that a first access node goes online; obtaining, by a virtual access node on the central node, configuration information related to the first access node after the central node receives the go-online notification; and sending, by the virtual access node, the configuration information related to the first access node to the first access node.

In the information processing method provided in this embodiment, after receiving the go-online notification indicating that the first access node goes online, the central node obtains the configuration information related to the first access node, and sends the obtained configuration information related to the first access node to the first access node.

In this way, after receiving the configuration information related to the first access node, the first access node can run after performing configuration according to the configuration information related to the first access node. This implements plug-and-play of the first access node. The first access node may be any type of access node including a remote access node. Therefore, the first access node does not need to be manually configured before accessing a network, thereby reducing device management complexity of the first access node.

The embodiments further provide an authentication method and a server, to prevent an invalid node from accessing a communications network.

An authentication method provided in an embodiment includes: performing, by an authentication server after receiving an authentication request that requests to perform authentication on whether a first access node is a legal node, authentication on whether the first access node is a legal node; and sending, by the authentication server, an authentication response indicating that the first access node is a legal node, after determining that the first access node is a legal node.

In the authentication method, authentication is performed on a node device on a communications network, thereby preventing an invalid node from accessing the communications network.

The embodiments are described in detail below with reference to the accompanying drawings. First, the information processing method and the network node provided in the embodiments are described, and then, the authentication method and the server provided in the embodiments are described.

First, the information processing method and the network node provided in the embodiments are described below.

A communications network provided in an embodiment is described first from a perspective of cooperation between network nodes, and then, the information processing method and the network node provided in the embodiments are separately described, which however does not mean that network nodes need to be implemented in combination with each other. Actually, a problem of each network node can also be resolved by means of separate implementation.

Figure 2:
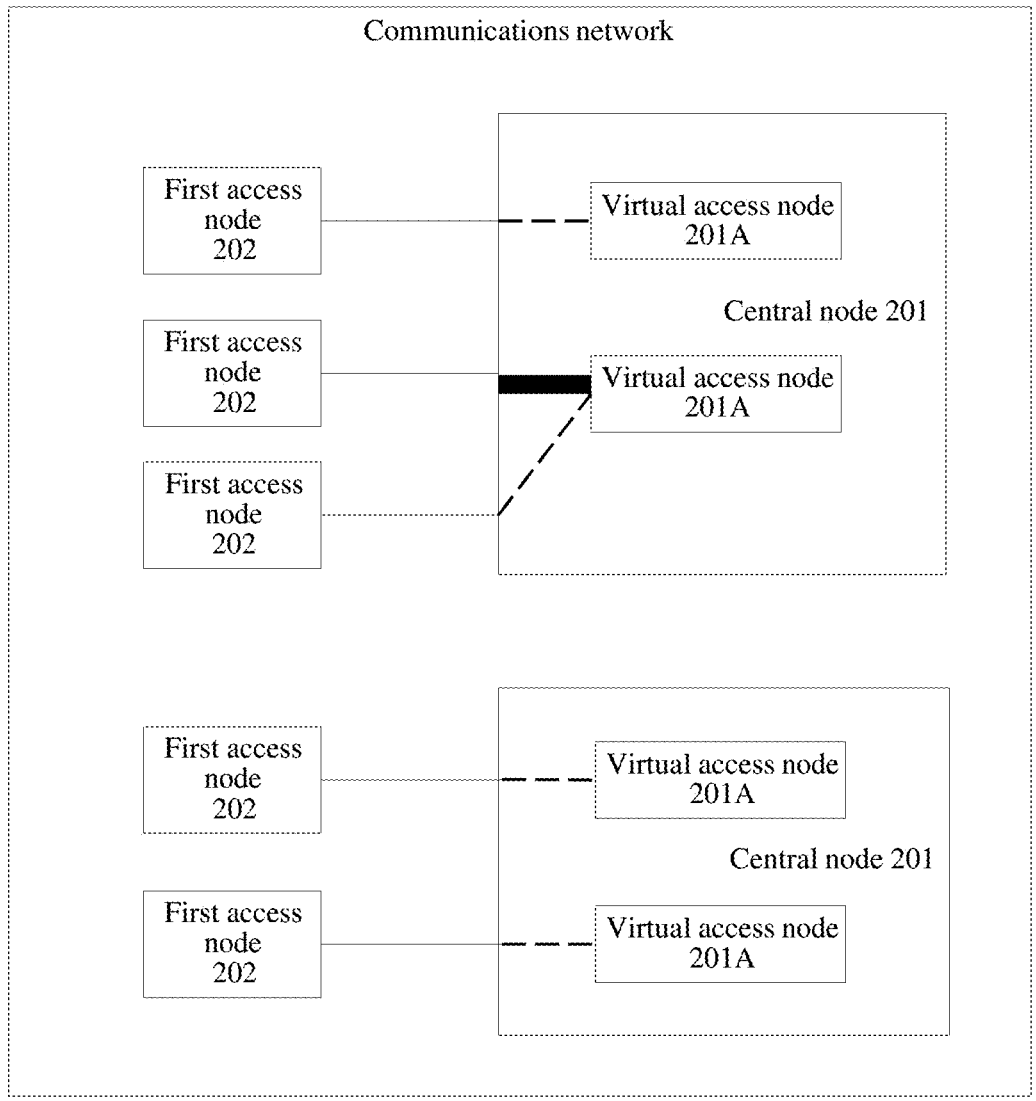
FIG. 2 is a schematic structural diagram of a communications network according to an embodiment.

FIG. 2 is a schematic structural diagram of a communications network according to an embodiment. As shown in FIG. 2, the communications network includes: one or more central nodes 201, and one or more first access nodes 202 connected to the central nodes 201.

The first access node 202 is configured to: when the first access node 202 is powered on or accesses a communications network, send, to the central node 201 connected to the first access node 202, a go-online notification used to notify that the first access node 202 goes online.

The central node 201 is configured to: after receiving a go-online notification sent by a first access node 202 connected to the central node 201, obtain configuration information related to the first access node 202 by using a virtual access node 201A that is on the central node 201 and that corresponds to the first access node 202, and send the obtained configuration information to the first access node 202. The configuration information related to the first access node 202 includes configuration information of the first access node 202, or configuration information of a user-side port on the first access node 202.

The first access node 202 is further configured to: before running, perform self-configuration according to the configuration information related to the first access node 202 that is sent by the central node 201 connected to the first access node 202.

Because the virtual access node 201A is a virtual node on the central node 201, a connection line between the first access node 202 and the corresponding virtual access node 201A in the central node 201 in FIG. 2 is a dashed line, and is used to indicate a correspondence between the first access node 202 and the virtual access node 201A. The first access nodes 202 may be access nodes of a same type or different types. The virtual access nodes 201A may also emulate access nodes of different types with remote access nodes. For example, a remote access node of a cable modem termination system (CMTS) type may emulate a virtual access node of a digital subscriber line access multiplexer (DSLAM) type.

The accessing a network may include a case in which the first access node includes a user-side port and a communication connection is established between the first access node and a network side.

The communications network provided in this embodiment not only may be the optical access network shown in FIG. 1, but also may be another communications network. Regardless of the type of communications network to which the embodiments are applied, when there is a large quantity of remote access nodes on the communications network, remote access nodes do not need to be manually configured before accessing the network, thereby reducing complexity in managing the remote access nodes on the communications network.

In this embodiment, the first access node 202 may be an access node of any type including a remote access node.

When the communications network in this embodiment is the optical access network shown in FIG. 1, the first access node 202 such as a remote access node (Remote AN) may be various devices such as a customer premises equipment (CPE), a drop point unit (DPU), an optical network terminal (ONT), a cable modem (CM), a cable media converter (CMC), a miniaturized switch, a miniaturized multi-x unit (MxU), a miniaturized DSLAM, a miniaturized CMTS, or a miniaturized converged cable access platform (CCAP).

The first access node 202 and the central node 201 may be connected by using various connection manners such as a DSL, an Ethernet, a Cable/Coax, and a passive optical network (PON).

The central node 201 may be connected to an Internet Protocol (IP) edge node (IP Edge). The central node 201 may be an OLT, a convergence node, a large DSLAM, or a large switch. The IP edge node may be a device such as a broadband network gateway (BNG) or a broadband remote access server (BRAS).

Alternatively, the central node 201 is connected to a software defined networking (SDN) controller. The central node 201 may be an OLT, a convergence node, an IP edge node, a large DSLAM, or a large switch. Similarly, the IP edge node may be a device such as a BNG or a BRAS.

Alternatively, the central node 201 may be virtualized into a data center and exists in a device form of a server, and is connected to a server of another operator such as an operation support system (OSS), a network management system (NMS), a Dynamic Host Configuration Protocol (DHCP) server, an authentication, authorization and accounting (AAA) server, or a configuration server.

Figure 9:
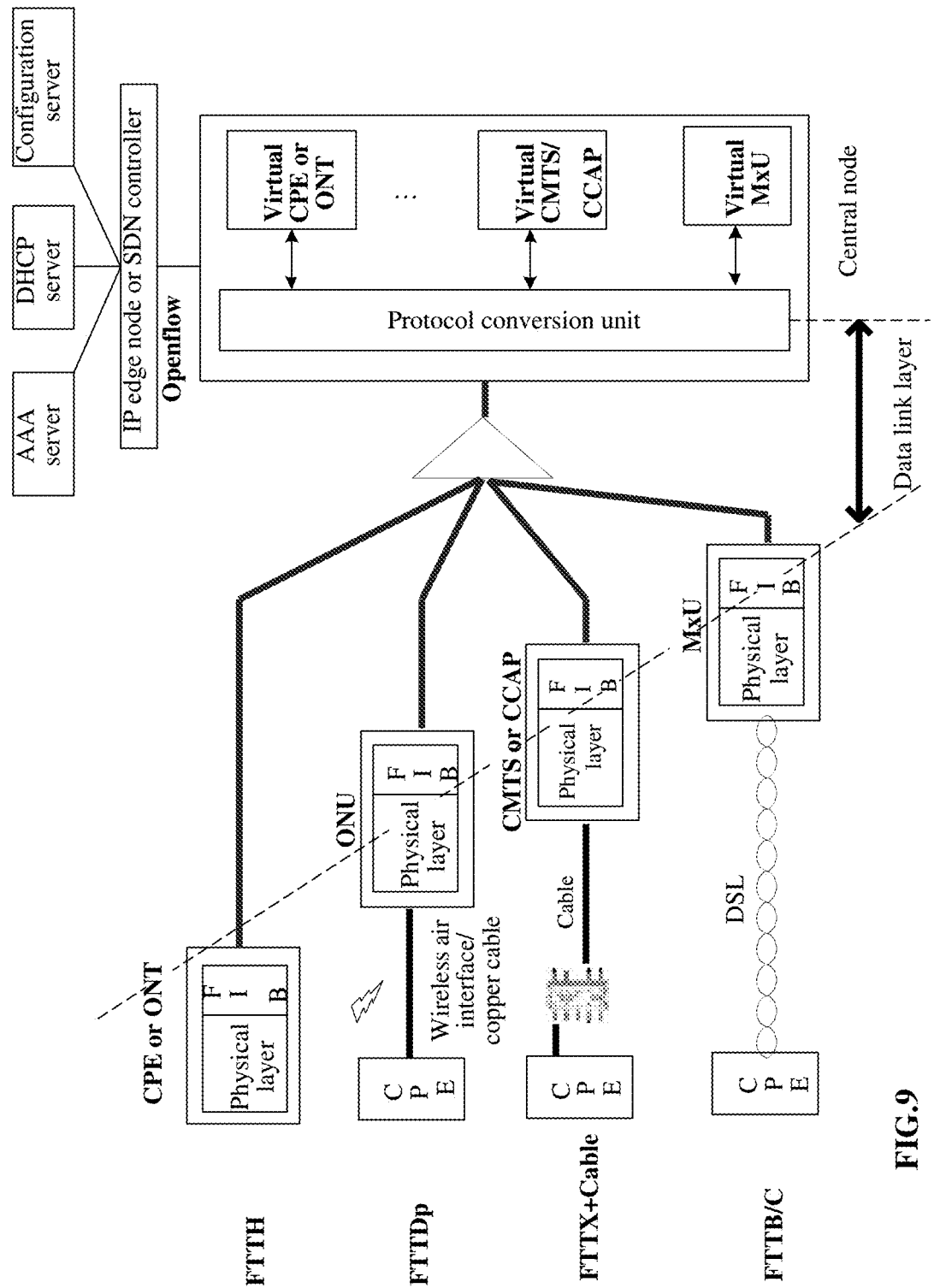
FIG. 9 is a diagram of a network topology of an optional access network according to an embodiment.

For a specific example of the application of the embodiments to an optical access network, refer to the following embodiment shown in FIG. 9.

In this embodiment, to reduce management and maintenance of a large quantity of first access nodes 202, when one or more first access nodes 202 are powered on or access a network, each first access node 202 sends a go-online notification to the central node 201 connected to the first access node 202, to automatically trigger formation of a virtual access node (Virtual AN) 201A corresponding to the first access node 202, thereby implementing plug-and-play of the first access node 202. Optionally, the virtual access node 201A is located on the central node 201.

Optionally, after receiving the foregoing go-online notification sent by the first access node 202 connected to the central node 201, the central node 201 determines related information of the virtual access node 201A corresponding to the first access node 202. The related information is, for example, an identifier of the virtual access node 201A, and may further include a port identifier of a virtual port of the virtual access node 201A and the like.

The central node 201 may determine the related information of the virtual access node 201A in the following two optional manners.

Manner 1: The central node 201 assigns the identifier of the virtual access node 201A corresponding to the first access node 202, and may further assign the port identifier of the virtual port of the virtual access node 201A.

Manner 2: The central node 201 sends a notification to an authentication server such as an OSS, an NMS, an SDN controller, or an AAA server on the communications network on which the central node 201 is located, to notify that the first access node 202 has gone online, where the notification may carry an identifier of the first access node 202.

After receiving the notification, the authentication server determines the related information of the virtual access node 201A corresponding to the first access node 202, for example, the identifier of the virtual access node 201A and/or the port identifier of the virtual port of the virtual access node 201A. This may be specifically implemented by using the following steps:

First, it is determined whether a corresponding virtual access node 201A needs to be established for the first access node 202. Optionally, the virtual access node 201A is located on the central node 201. If yes, an identifier of the virtual access node 201A corresponding to the first access node 202 is assigned, and a port identifier of a virtual port of the virtual access node 201A or the like may be further assigned; or if not, a recorded identifier of the virtual access node 201A corresponding to the first access node 202 is queried for, and a port identifier of a virtual port of the virtual access node 201A or the like may be further queried for.

The authentication server sends the determined related information of the virtual access node 201A corresponding to the first access node 202 to the central node 201. Optionally, if determining that a virtual access node 201A needs to be established, the authentication server may send the related information of the virtual access node 201A by using a message indicating that the virtual access node 201A needs to be established, where the message also carries an identifier of the first access node 202.

After receiving the related information of the virtual access node 201A from the authentication server, the central node 201 records a correspondence between the identifier of the first access node 202, the related information of the virtual access node 201A corresponding to the first access node 202, and related information of the first access node 202.

Herein, it may be considered that the first access node 202 is mapped to the virtual access node 201A. For example, the virtual access node 201A on the central node 201 may be considered as a logical functional entity, to which the first access node 202 is mapped, on the central node 201. On the side of an NMS or OSS of an operator, the virtual access node 201A instead of the first access node 202 is seen.

Optionally, one virtual access node 201A corresponds to one first access node 202 connected to the central node 201, or corresponds to multiple first access nodes 202 connected to the central node 201.

Figure 19:
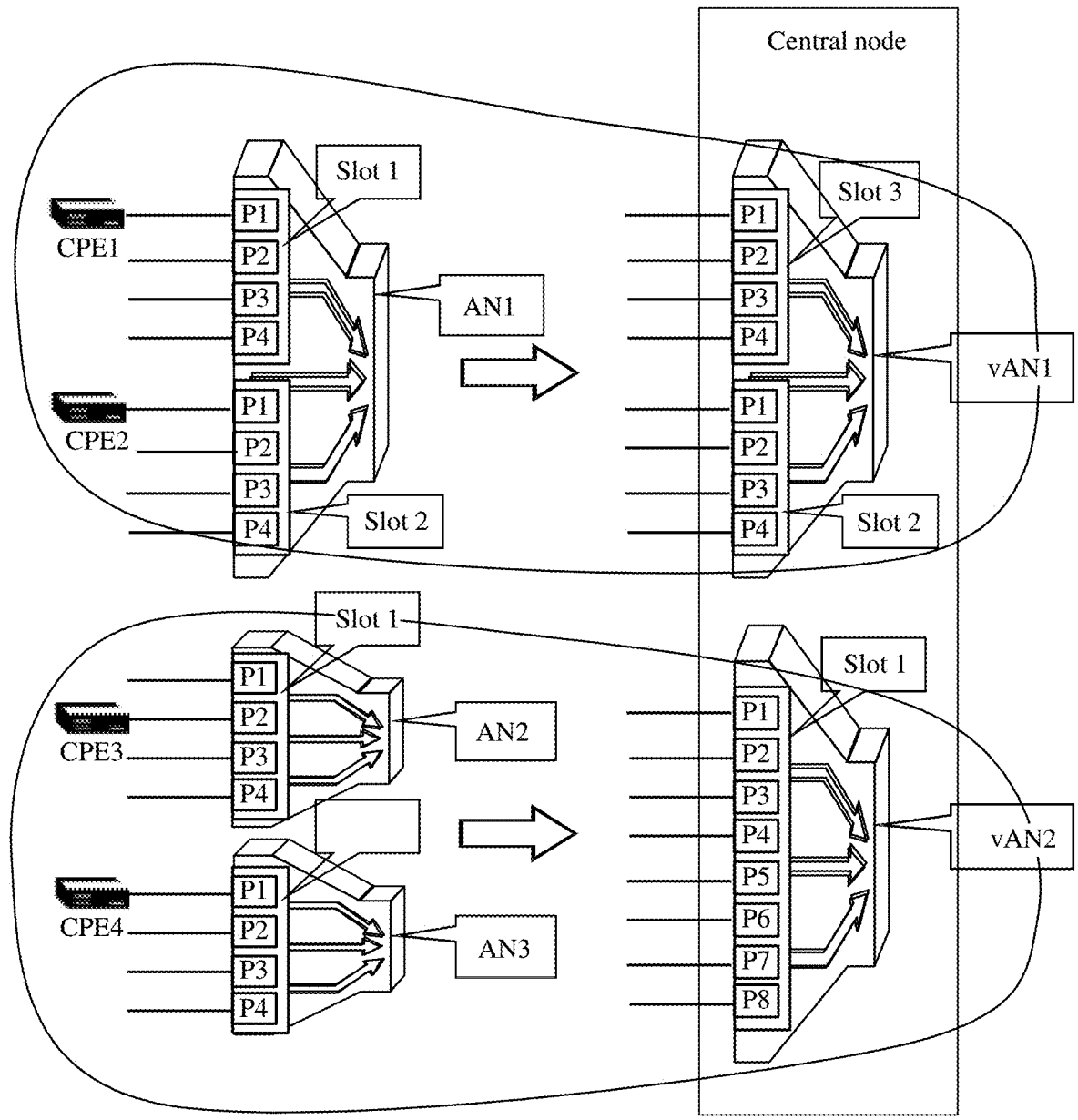
FIG. 19 is a schematic diagram of a network structure according to an embodiment.

On a network shown in FIG. 19, a central node includes two virtual access nodes: vAN1 and vAN2. vAN1 corresponds to an access node AN1, and vAN2 corresponds to an access node AN2 and an access node AN3. In this embodiment, when an access node is not explicitly defined as a virtual access node, the access node should be construed as a physical access node. For example, AN1, AN2, and AN3 are all physical access nodes.

vAN1 may be construed as a virtual AN1. Each port of AN1 corresponds to a virtual port of vAN1. For example, a physical port AN1/slot1/port1 of AN1 corresponds to a virtual port vAN1/slot3/port1 of vAN1, and vAN1/slot3/port1 is a virtual port of AN1/slot1/port1 on vAN1. The expression AN number/slot number/port number is actually a line identifier (line ID) used to uniquely identify a port number when there is more than one port number. A detailed correspondence between physical ports of AN1 and virtual ports of vAN1 is shown in Table 01. It should be noted that, each physical port of AN1 does not necessarily correspond to a virtual port of vAN1, and one virtual port may correspond to multiple physical ports.

vAN2 includes multiple virtual ports, and each virtual port corresponds to a physical port of AN2 or AN3. For example, a virtual port vAN2/slot1/port1 of vAN2 corresponds to a physical port AN3/slot1/port1 of AN3. A detailed correspondence between virtual ports of vAN2 and physical ports of AN2 or AN3 is shown in Table 02. AN2 and AN3 may be considered as an access node group, and it may be considered that vAN2 corresponds to the access node group.

TABLE 01

| Physical line identifier | Virtual line identifier |
|---|---|
| AN1/slot1/port1 | vAN1/slot3/port1 |
| AN1/slot1/port2 | vAN1/slot3/port2 |
| AN1/slot1/port3 | vAN1/slot3/port3 |
| AN1/slot1/port4 | vAN1/slot3/port4 |
| AN1/slot2/port1 | vAN1/slot2/port1 |
| AN1/slot2/port2 | vAN1/slot2/port2 |
| AN1/slot2/port3 | vAN1/slot2/port3 |
| AN1/slot2/port4 | vAN1/slot2/port4 |

TABLE 02

| Physical line identifier | Virtual line identifier |
|---|---|
| AN2/slot1/port1 | vAN2/slot1/port1 |
| AN2/slot1/port2 | vAN2/slot1/port2 |

TABLE 02-continued

| Physical line identifier | Virtual line identifier |
|---|---|
| AN2/slot1/port3 | vAN2/slot1/port3 |
| AN2/slot1/port4 | vAN2/slot1/port4 |
| AN3/slot1/port1 | vAN2/slot1/port5 |
| AN3/slot1/port2 | vAN2/slot1/port6 |
| AN3/slot1/port3 | vAN2/slot1/port7 |
| AN3/slot1/port4 | vAN2/slot1/port8 |

In FIG. 19, it may be considered that CPE1 connected to the physical port AN1/slot1/port1 is connected to the virtual port vAN1/slot3/port1, it may be considered that CPE2 connected to the physical port AN1/slot2/port1 is connected to the virtual port vAN1/slot2/port1, it may be considered that CPE3 connected to the physical port AN2/slot1/port2 is connected to the virtual port vAN2/slot1/port2, and it may be considered that CPE4 connected to the physical port AN3/slot1/port1 is connected to the virtual port vAN2/slot1/port5.

Figure 20:
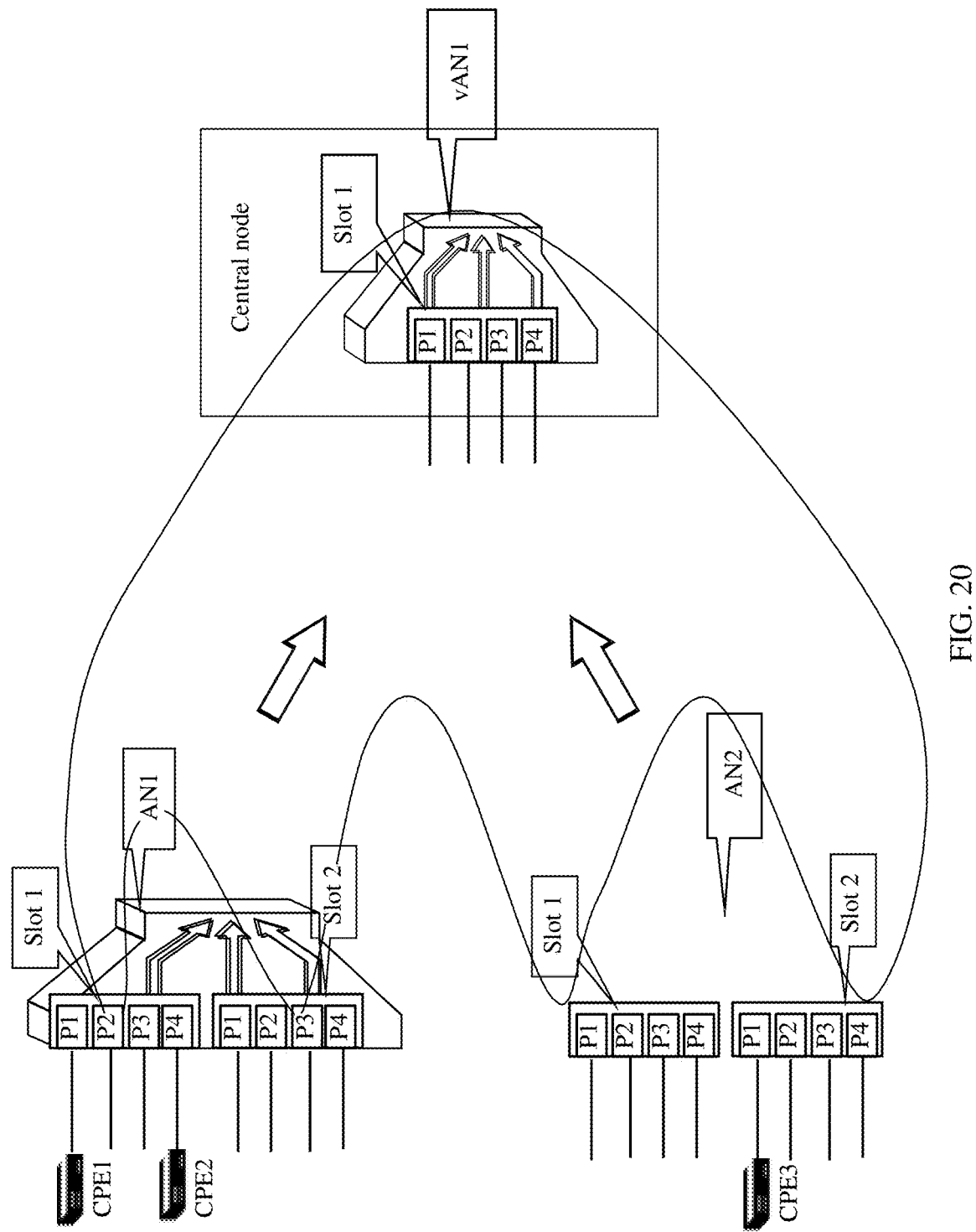
FIG. 20 is a schematic diagram of a network structure according to an embodiment.

On a network shown in FIG. 20, a central node includes a virtual access node vAN1, vAN1 corresponds to two access nodes, and the two access nodes are AN1 and AN2 and both are physical access nodes. One virtual port of vAN1 corresponds to multiple physical ports of AN1 or AN2. For example, a virtual port vAN1/slot1/port1 corresponds to four physical ports in slot 1 of AN1. A detailed correspondence between virtual ports of vAN1 and physical ports of AN1 or AN2 is shown in Table 03.

TABLE 03

| Physical line identifier | Virtual line identifier |
|---|---|
| AN1/slot1/port1 | vAN1/slot1/port1 |
| AN1/slot1/port2 | |
| AN1/slot1/port3 | |
| AN1/slot1/port4 | |
| AN1/slot2/port1 | vAN1/slot1/port2 |
| AN1/slot2/port2 | |
| AN1/slot2/port3 | |
| AN1/slot2/port4 | |
| AN2/slot1/port1 | vAN1/slot1/port3 |
| AN2/slot1/port2 | |
| AN2/slot1/port3 | |
| AN2/slot1/port4 | |
| AN2/slot2/port1 | vAN1/slot1/port4 |
| AN2/slot2/port2 | |
| AN2/slot2/port3 | |
| AN2/slot2/port4 | |

In FIG. 20, it may be considered that both CPE1 connected to the physical port AN1/slot1/port1 and CPE2 connected to the physical port AN1/slot1/port4 are connected to the virtual port vAN1/slot1/port1, and it may be considered that CPE3 connected to the physical port AN2/slot2/port1 is connected to the virtual port vAN1/slot1/port4.

When the virtual access node 201A corresponds to multiple first access nodes 202, the multiple corresponding first access nodes 202 may form an access node group, and the central node 201 stores a correspondence between the virtual access node 201A and the access node group.

After the first access node 202 is powered on or accesses the communications network, if the virtual access node 201A corresponding to the first access node 202 already exists on the central node 201, the central node 201 directly determines the virtual access node 201A corresponding to the first access node 202, or if no virtual access node 201A corresponding to the first access node 202 exists on the central node 201, the central node 201 creates a virtual access node 201A corresponding to the first access node 202.

The virtual access node 201A replaces the first access node 202 to obtain the configuration information related to the first access node 202, and deliver the obtained configuration information related to the first access node 202 to the first access node 202, so that automatic configuration of the first access node 202 is implemented. Optionally, when the configuration information related to the first access node 202 is configuration information of the first access node 202, the configuration information related to the first access node 202 includes device configuration information used to configure a device parameter of the first access node 202, and may further include service configuration information used to configure a service parameter of a service that can run on the first access node 202.

Optionally, the central node 201 may obtain the configuration information related to the first access node 202 in the following manners.

Manner 1: The configuration information related to the first access node 202 is directly obtained from a configuration server.

Specifically, a configuration information request message that includes an identifier of the first access node or includes an identifier of the virtual access node is sent to a configuration server that is a server providing the foregoing configuration information related to the first access node 202, and the configuration information related to the first access node 202 that is sent by the configuration server is received.

Manner 2: File information of a configuration file that includes the configuration information related to the first access node 202 is determined first, and the configuration information related to the first access node 202 is then obtained from the configuration file.

Specifically, the file information of the configuration file that includes the configuration information related to the first access node 202 is determined.

A first IP packet used to request the configuration information related to the first access node 202 is sent, where a source IP address of the first IP packet is a management IP address of the virtual access node 201A, and a destination IP address of the first IP packet is an IP address determined according to the file information.

A second IP packet that carries the configuration information related to the first access node 202 is received, where the second IP packet is a response packet of the first IP packet.

The configuration information related to the first access node 202 is obtained from the second IP packet.

The response packet of the first IP packet is a packet sent in response to the first IP packet, where a source IP address of the response packet is the destination IP address of the first IP packet, and a destination IP address of the response packet is the source IP address of the first IP packet.

For manner 2, the central node 201 may determine the file information of the configuration file that includes the foregoing configuration information related to the first access node 202 in the following manner: receiving a DHCP message that carries the file information; and determining the file information of the configuration file according to the DHCP message.

The file information in the DHCP message is inserted into the DHCP message by a DHCP server; or the file information in the DHCP message is inserted into the DHCP message by an intermediate network device between an AAA server and the central node 201.

Optionally, the intermediate network device may be an SDN controller, an IP edge node such as a BNG, or the like.

The manner in which the central node 201 obtains the configuration file related to the first access node 202 varies different file information of the configuration file. which is specifically as follows:

If the file information of the configuration file includes: an IP address of a configuration server on which the configuration file is located, and an identifier of the configuration file, for example, a file name or a file number, the central node 201 sends the foregoing first IP packet by using the management IP address of the virtual access node 201A corresponding to the first access node 202 as the source IP address and using the IP address of the configuration server on which the configuration file is located as the destination IP address, to obtain a configuration file on the configuration server that is identified by the identifier of the configuration file; receives the foregoing second IP packet that uses the IP address of the configuration server as the source IP address and uses the management IP address of the virtual access node 201A corresponding to the first access node 202 as the destination IP address and that includes the configuration file of the first access node 202 connected to the central node 201; and obtains, from the second IP packet, the configuration file that includes the configuration information related to the first access node 202.

If the file information of the configuration file includes: an IP address of a configuration server on which the configuration file is located, an identifier of the configuration file, and an identifier of the configuration information related to the first access node 202, where one configuration file includes multiple pieces of configuration information related to the first access node 202, the central node 201 sends the foregoing first IP packet by using the management IP address of the virtual access node 201A corresponding to the first access node 202 as the source IP address and using the IP address of the configuration server on which the configuration file is located as the destination IP address, where the first IP packet includes the identifier of the configuration file and the identifier of the configuration information related to the first access node 202, to obtain configuration information, which is identified by the identifier of the configuration information related to the first access node 202, in a configuration file on the configuration server that is identified by the identifier of the configuration file; receives the foregoing second IP packet that uses the IP address of the configuration server as the source IP address and uses the management IP address of the virtual access node 201A corresponding to the first access node 202 as the destination IP address, and that includes the configuration information related to the first access node 202 connected to the central node 201; and obtains, from the second IP packet, the configuration information related to the first access node 202.

If the file information of the configuration file includes a uniform resource identifier (URI) address of the configuration file, the central node 201 sends the foregoing first IP packet for accessing the URI address, by using the management IP address of the virtual access node 201A corresponding to the first access node 202 as the source IP address; receives a second IP packet that is sent by a configuration server corresponding to the URI address by using the management IP address of the virtual access node 201A corresponding to the first access node 202 as the destination IP address and that includes a configuration file corresponding to the URI address; and obtains, from the second IP packet, the configuration file that includes the configuration information related to the first access node 202.

Optionally, the virtual access node 201A determines the management IP address of the virtual access node 201A before obtaining the configuration information related to the first access node 202.

Currently, management IP addresses of remote access nodes such as a CPE and an ONT are usually set to be the same before the devices are delivered from a factory, and the management IP addresses of the devices need to be configured manually on site before the devices access a network to run. Consequently, automatic configuration of each first access node cannot be implemented. Because configuration does not need to be performed manually on site when the foregoing optional solution is used, complexity in maintaining remote access nodes and manpower costs are reduced.

Moreover, in this optional solution, there is no need to set a management IP address for each first access node 202, but instead a corresponding management IP address is set on a virtual access node 201A corresponding to the first access node 202. When multiple first access nodes 202 correspond to one virtual access node 201A, the multiple first access nodes 202 share a management IP address of the corresponding virtual access node 201A. Therefore, IP addresses are saved, and maintenance of management IP addresses is also reduced.

Optionally, the go-online notification sent by the first access node 202 to the central node 201 is sent to the central node 201 based on a first protocol, and the virtual access node 201A also sends the configuration information related to the first access node 202 to the first access node 202 based on the first protocol.

The first protocol includes a physical layer protocol, a data link layer protocol, or an IP layer protocol.

Specifically, for a communications protocol used when the first access node 202 and the central node 201 connected to the first access node 202 communicate with each other, the following three optional solutions may be used.

Solution 1: The first access node 202 sends, based on a data link layer protocol such as a Media Access Control (MAC) protocol, the go-online notification to the central node 201 connected to the first access node 202; the central node 201 sends, based on the data link layer protocol, configuration information of a remote access node, that is, the first access node 202 connected to the central node 201, to the first access node 202 connected to the central node 201.

Solution 2: The first access node 202 sends, based on an IP layer protocol, the go-online notification to the central node 201 connected to the first access node 202; the central node 201 sends, based on the IP layer protocol, the configuration information of the first access node 202 connected to the central node 201, to the first access node 202 connected to the central node 201.

Solution 3: The first access node 202 sends, based on a physical layer protocol, the go-online notification to the central node 201 connected to the first access node 202; the central node 201 sends, based on the physical layer protocol, configuration information of a remote access node connected to the central node 201, to the first access node 202 connected to the central node 201.

In solution 1, because the first access node 202 and the central node 201 communicate with each other based on the data link layer protocol, for example, by using a data link layer message, and the management IP address is configured on the virtual access node 201A instead of the first access node 202, the first access node 202 needs to support only a data link layer and a lower protocol layer, and no longer needs to support various upper-layer protocols for control and configuration and the Transmission Control Protocol (TCP)/IP Protocol. Therefore, implementation complexity of the first access node 202 is reduced, and power consumption and device costs of the first access node 202 are reduced.

In solution 2, the first access node 202 still needs to support the IP layer protocol, but does not need to support protocols of various layers higher than the IP layer. Therefore, implementation complexity of the first access node 202 can also be reduced to some extent, and device power consumption and device costs can also be reduced to some extent.

In solution 3, because the first access node 202 and the central node 201 communicate with each other based on the physical layer protocol, and the management IP address is configured on the virtual access node 201A instead of the first access node 202, the first access node 202 needs to support only the physical layer protocol, and no longer needs to support the data link layer, various upper-layer protocols for control and configuration, and the Transmission Control Protocol (TCP)/IP Protocol. Therefore, implementation complexity of the first access node 202 is reduced, and power consumption and device costs of the first access node 202 are reduced.

Optionally, a first format of the foregoing configuration information related to the first access node 202 that is obtained by the virtual access node 201A conforms to a requirement of the IP layer protocol or conforms to a requirement of a protocol of a layer that is higher than an IP layer in an Open System Interconnection (OSI) model, that is, the central node 201 obtains, by using the virtual access node 201A corresponding to the first access node 202 connected to the central node 201, the configuration information related to the first access node 202 connected to the central node 201 that is sent based on a protocol of a layer higher than the IP layer.

If the first access node 202 and the central node 201 connected to the first access node 202 communicate with each other by using the foregoing solution 1, the central node 201 converts the obtained configuration information related to the first access node 202 that is sent based on a protocol of a layer higher than the IP layer to configuration information that is related to the first access node 202 and that is based on the data link layer protocol, and sends the converted configuration information to the first access node 202.

If the first access node 202 and the central node 201 connected to the first access node 202 communicate with each other by using the foregoing solution 2, the central node 201 converts the obtained configuration information related to the first access node 202 that is sent based on a protocol of a layer higher than the IP layer to configuration information that is related to the first access node 202 and that is based on the IP layer protocol, and sends the converted configuration information to the first access node 202.

If the first access node 202 and the central node 201 connected to the first access node 202 communicate with each other by using the foregoing solution 3, the central node 201 converts the obtained configuration information related to the first access node 202 that is sent based on a protocol of a layer higher than the IP layer to configuration information that is related to the first access node 202 and that is based on the physical layer protocol, and sends the converted configuration information to the first access node 202.

For example, the configuration information related to the first access node 202 that is sent based on a protocol of a layer higher than the IP layer and that is obtained by the central node 201 may be configuration information related to the first access node 202 that is included in a configuration file transmitted based on the File Transfer Protocol (FTP). If the foregoing solution 1 is used, the central node 201 converts the configuration file transmitted based on the FTP protocol to a configuration file that is based on the data link layer protocol such as an Optical Network Node Management and Control Interface (OMCI) Protocol, an Ethernet management channel protocol like an IEEE 1904.2 protocol, or an Ethernet Operation Administration and Maintenance (ETH OAM) protocol, and sends the converted configuration file to the first access node 202; or sends the configuration information related to the first access node 202 in the configuration file transmitted based on the FTP protocol, to the first access node 202 based on the foregoing data link layer protocol.

Optionally, the foregoing configuration information related to the first access node 202 includes a forwarding table entry, and the first access node 202 configures a forwarding table for itself according to the forwarding table entry in the configuration information related to the first access node 202.

If one virtual access node 201A corresponds to multiple first access nodes 202, the central node 201 splits a forwarding table entry obtained by using the virtual access node 201A, and sends a forwarding table entry corresponding to one first access node 202 that is obtained by splitting, to the first access node 202.

Optionally, the forwarding table entry obtained by the virtual access node 201A may include: an ingress port, an identifier of a service that the virtual access node 201A needs to process, and an egress port; and the central node 201 may split, in the following manner, the forwarding table entry obtained by the virtual access node 201A: generating, by the central node 201 according to the forwarding table entry obtained by the virtual access node 201A, a forwarding table entry for each first access node 202 corresponding to the virtual access node 201A, where the forwarding table entry of each first access node 202 includes an ingress port, an egress port, and an identifier of a service that the first access node 202 needs to process.

Figure 15:
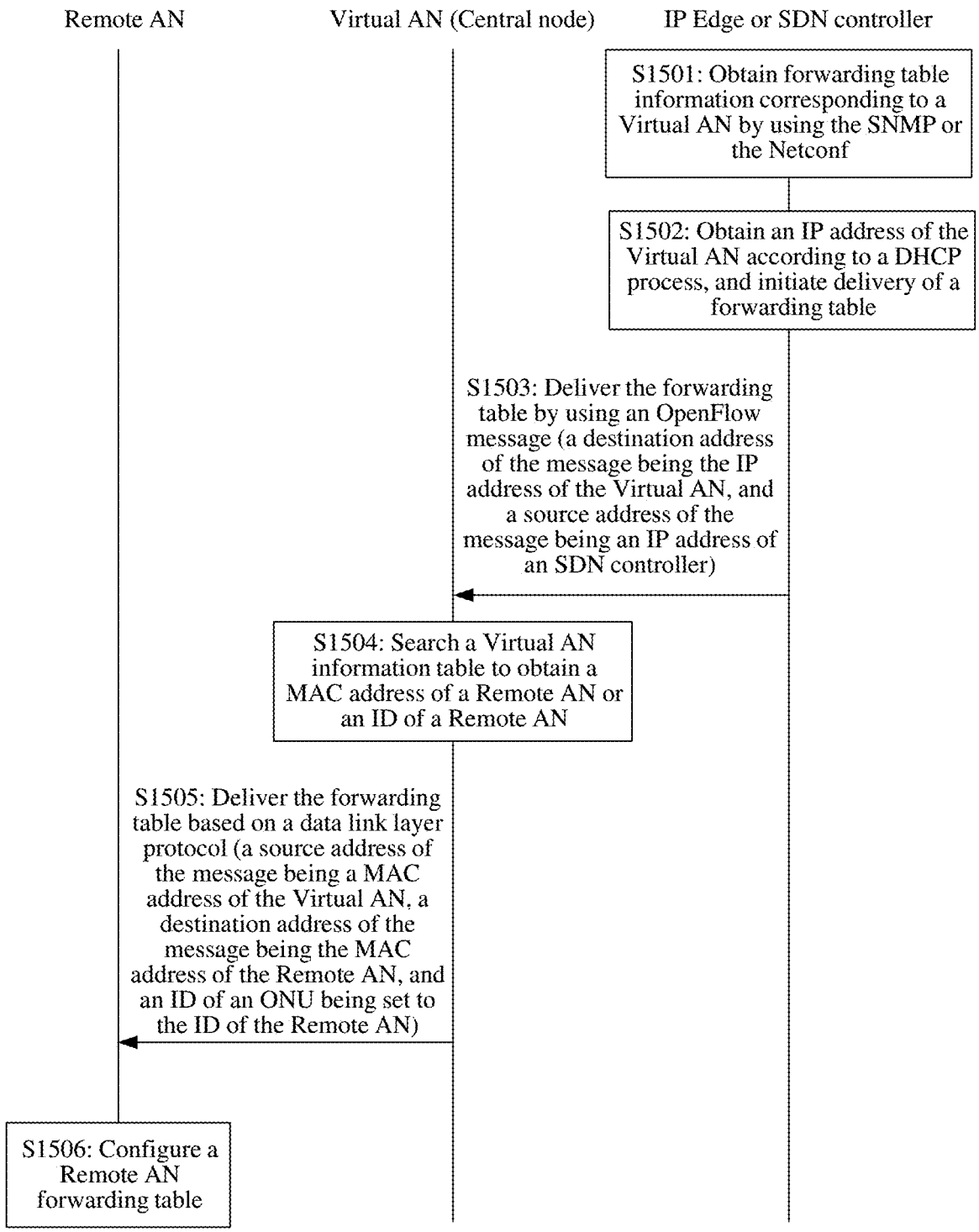
FIG. 15 is a flowchart of an embodiment.

For an example of configuring a forwarding table, refer to the following embodiment shown in FIG. 15.

Optionally, the central node 201 may determine, in the following manner, the file information of the configuration file that includes the configuration information related to the first access node 202 connected to the central node 201: obtaining the file information of the configuration file that includes the configuration information of the remote access node, that is, the first access node 202 connected to the central node 201, from a DHCP message sent by a DHCP server connected to the central node 201 on the communications network.

Figure 11:
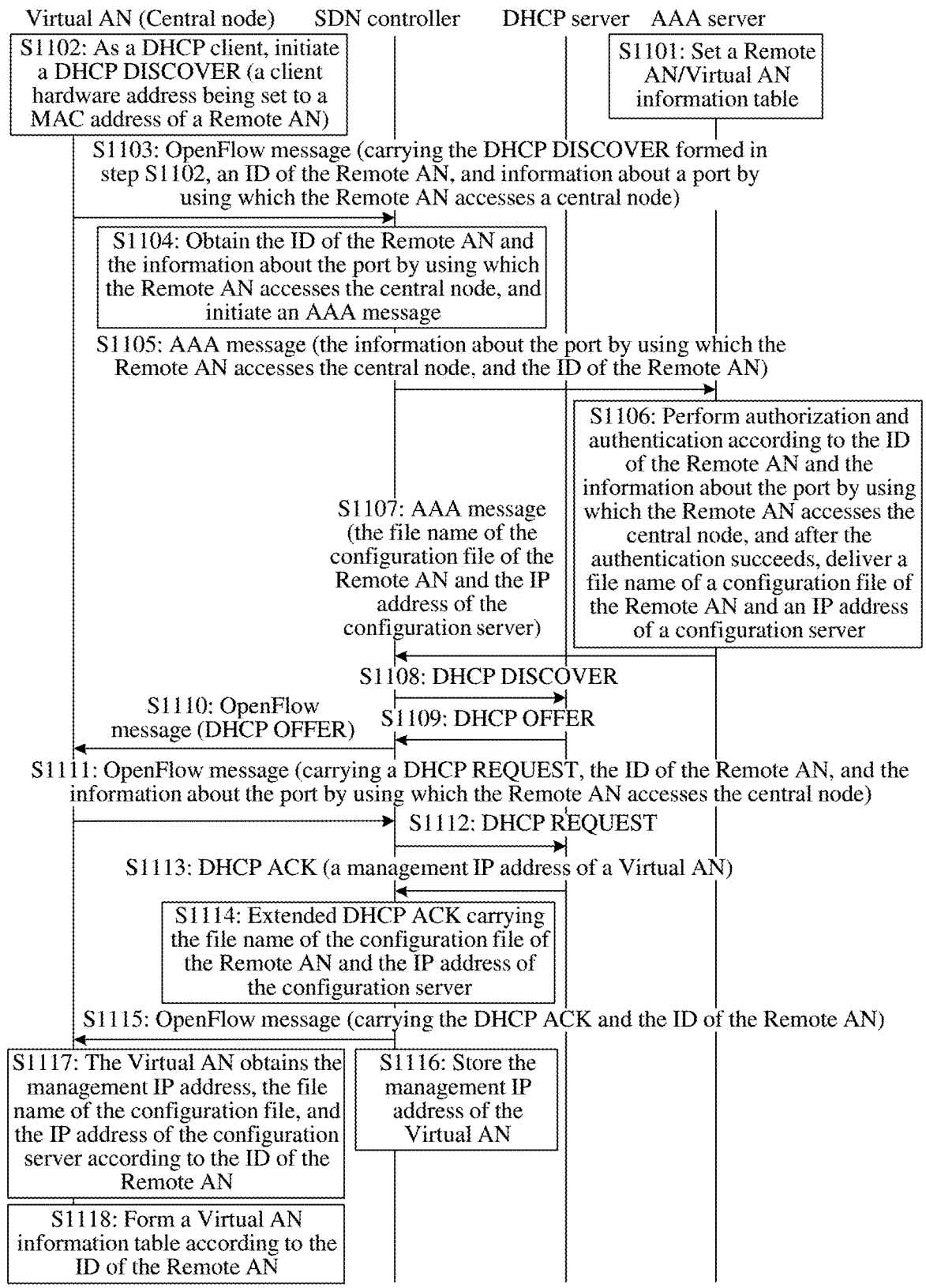
FIG. 11 is a flowchart of an embodiment.

For an example, refer to the following embodiment shown in FIG. 11. In step S1105, an SDN controller sends an AAA message to an AAA server, that is, an authentication server on the communications network that is configured to perform authentication on whether a node is a legal node, to request to perform authorization and authentication on a first access node 202, that is, a Remote AN in FIG. 11, that is, perform authentication on whether the Remote AN is a legal node on the communications network. After having authenticated the Remote AN, the AAA server delivers, to the SDN controller, file information of a configuration file that includes configuration information related to the Remote AN. For example, the file information is a file name of the configuration file and an IP address of a configuration server in FIG. 11. In step S1114, the SDN controller sends the file name of the configuration file of the Remote AN and the IP address of the configuration server to the central node 201 by using a DHCP message, that is, a DHCP ACK message in FIG. 11. The configuration information related to the Remote AN may be configuration information of the Remote AN, or may be configuration information of a user-side port of the Remote AN.

Referring to FIG. 11, it can be further seen that, in an optional implementation manner, the foregoing authentication server on the communications network pre-stores the file information of the configuration file that includes the configuration information related to the Remote AN. Therefore, in this optional implementation manner, the central node 201 obtains, from the authentication server such as an AAA server or a DHCP server in FIG. 11, the file information of the configuration file that includes the configuration information related to the first access node 202 connected to the central node 201.

Optionally, the central node 201 is further configured to: before determining the file information of the configuration file that includes the configuration information related to the first access node 202 connected to the central node 201 and determining the management IP address of the virtual access node 201A, determine that the first access node 202 is a legal node on the communications network.

Specifically, the central node 201 sends, to the foregoing authentication server that performs authentication on validity of a node on the communications network, an authentication request message for performing authentication on validity of the first access node 202 connected to the central node 201 or the virtual access node 201A corresponding to the first access node 202, that is, sends an authentication request for the first access node 202. The authentication request is, for example, the AAA message sent in step S1105 in FIG. 11, and may be an Access Request message. After receiving an authentication success message sent by the authentication server in response to the authentication request message, that is, an authentication response indicating that the first access node 202 is a legal node, the central node 201 determines that the first access node 202 connected to the central node 201 is a legal node on the communications network. The authentication response is, for example, an AAA message sent in step S1107 in FIG. 11, and may be an Access Accept message.

Optionally, as shown in FIG. 11, the authentication success message carries the file information of the configuration file that includes the configuration information related to the first access node 202, the authentication success message is sent to the SDN controller, and the SDN controller sends the authentication success message to the central node 201 by using a DHCP message.

In this optional solution, the authentication server not only can perform authentication on whether the first access node 202 is a legal node on the communications network, but also provides the file information of the configuration file that includes the configuration information related to the first access node 202, so that the central node 201 no longer needs to obtain, from another server, the file information of the configuration file that includes the configuration information related to the first access node 202. Therefore, the communication process is accelerated, and implementation complexity of the central node 201 and complexity of the communications network are reduced.

Optionally, the file information of the configuration file on the foregoing authentication server may be pre-stored by an operator of the communications network. In a possible scenario, when planning the communications network, the operator plans a predetermined quantity of first access nodes 202. Before these first access nodes 202 work normally, the operator pre-stores, on the foregoing authentication server on the communications network, file information of a configuration file that includes configuration information related to these first access nodes 202. When the first access nodes 202 connected to the communications network are powered on or the first access nodes 202 access the communications network, the foregoing authentication server performs authentication on whether these first access nodes 202 are legal nodes on the communications network, and provides the file information of the configuration file that includes the configuration information related to these first access nodes 202.

It should be noted that the configuration information related to the first access node 202 may be stored in a file form, or may be stored in another form, for example, pre-stored in a configuration information database. After determining that the first access node 202 is a legal node on the communications network, the foregoing authentication server may provide related information of the configuration information database in which the configuration information related to the first access node 202 is located, so that the central node 201 finds the configuration information database according to the related information of the configuration information database, and obtains the configuration information related to the first access node 202 from the configuration information database.

Optionally, the foregoing authentication server may determine the file information of the configuration file corresponding to the first access node 202 in the following two manners.

Manner 1: The file information is determined according to an identifier of the first access node 202.

Manner 2: The file information is determined according to an identifier of the virtual access node 201A corresponding to the first access node 202.

Specifically, for the foregoing manner 1, when sending the foregoing authentication request message to the foregoing authentication server, the central node 201 adds the identifier of the first access node 202 to the authentication request message, or the central node 201 adds, to the authentication request message, both the identifier of the first access node 202 and a port identifier of a physical port by using which the first access node 202 accesses the central node 201; and after receiving the request message, the foregoing authentication server determines the file information of the configuration file corresponding to the first access node 202, according to the identifier of the first access node 202 in the message, or according to the identifier of the first access node 202 and the port identifier of the physical port by using which the first access node 202 accesses the central node 201 in the message.

For the foregoing manner 2, after receiving the go-online notification of the first access node 202, the central node 201 determines the virtual access node 201A corresponding to the first access node 202, and determines the identifier of the virtual access node 201A, or determines the identifier of the virtual access node 201A and a port identifier of a virtual port of the virtual access node 201A; when sending the foregoing authentication request message to the foregoing authentication server, the central node 201 adds the identifier of the virtual access node 201A, or adds the identifier of the virtual access node 201A and the port identifier of the virtual port of the virtual access node 201A to the authentication request message; and after receiving the authentication request message, the foregoing authentication server determines the file information of the corresponding configuration file, according to the identifier of the virtual access node 201A in the message, or according to the identifier of the virtual access node 201A and the port identifier of the virtual port of the virtual access node 201A in the message.

In the foregoing process, the identifier of the first access node 202 may be carried in the go-online notification sent by the first access node 202 to the central node 201, or may be assigned to the first access node 202 by the central node 201 after the central node 201 receives the go-online notification sent by the first access node 202.

In this embodiment, the identifier of the first access node 202 may include: an identifier (ID) of the first access node 202 and/or a Media Access Control (MAC) address of the first access node 202. These three optional identification forms are for exemplary purpose only, and actually, any form that can identify the first access node 202 can be applied to this embodiment.

If MAC addresses of first access nodes 202 on the communications network are different, the MAC address may be used as the identifier of the first access node 202. If the first access node 202 adds the identifier of the first access node 202 to the go-online notification, the first access node 202 does not need to explicitly add the MAC address of the first access node 202 to the go-online notification, but instead, adds the MAC address to a packet header of a data link layer of the go-online notification, so that the central node 201 can obtain the MAC address from the packet header of the data link layer when parsing the go-online notification.

When the identifier of the first access node 202 includes the ID of the first access node 202, if the first access node 202 adds the identifier to the go-online notification, the first access node 202 may explicitly add the ID to the go-online notification, so that the central node 201 obtains the ID from the go-online notification after receiving the go-online notification.

When the identifier of the first access node 202 includes the ID of the first access node 202 and the MAC address of the first access node 202, similarly, the first access node 202 may also explicitly add the ID to the go-online notification, and add the MAC address of the first access node 202 to a packet header of a data link layer of the go-online notification, so that the central node 201 can obtain the ID and the MAC address of the first access node 202 from the go-online notification.

If the central node 201 assigns the identifier of the first access node 202 to the first access node 202, the first access node 202 may add, to the go-online notification, information such as a device type of the first access node 202 and/or a type of a service that can run on the first access node 202, and the central node 201 assigns an ID to the first access node 202 according to the information such as the device type of the first access node 202 and/or the type of the service that can run on the first access node 202 in the go-online notification. If the identifier of the first access node 202 further includes the MAC address, the central node 201 may obtain the MAC address of the first access node 202 from the packet header of the data link layer of the go-online notification sent by the first access node 202.

In a possible application scenario, the operator of the communications network plans 100 first access nodes 202 whose device types are CPE. The first access nodes 202 are connected to a same central node 201 such as an OLT. Operation personnel have connected transmission lines of the 100 CPEs and the central node OLT, but some of the 100 CPEs are not powered on or none of the 100 CPEs is powered on. The operator preconfigures an ID list or an ID number segment of the 100 CPEs on the central node OLT. After one or more CPEs are powered on, each CPE sends a go-online notification carrying a device type of the first access node 202 being CPE to the central node 201. After receiving the go-online notification, the central node 201 determines that the device type of the first access node 202 is CPE, selects an unassigned ID from the preconfigured ID number segment or ID list, and assigns the selected ID to the first access node 202. Optionally, the central node 201 may send a go-online notification response carrying the assigned ID to the first access node 202 in response to the go-online notification, and the first access node 202 receives the go-online notification response, and obtains and stores the ID.

If the first access node 202 adds the identifier of the first access node 202 to the go-online notification, if the identifier of the first access node 202 includes the ID of the remote access node, the ID may be preconfigured in the first access node 202 when formalities are carried out for network access of the first access node 202.

As can be seen from the foregoing description, the overall concept of the solution for implementing plug-and-play of a first access node on a communications network according to the embodiments is as follows.

First, after a first access node 202 is powered on or accesses a communications network, the first access node 202 sends a go-online notification to a central node 201 connected to the first access node 202.

After receiving the go-online notification, the central node 201 determines a virtual access node 201A corresponding to the first access node 202, for example, creates a virtual access node 201A, and determines a management IP address of the virtual access node 201A.

Then, the central node 201 obtains, by using the virtual access node 201A, file information of a configuration file that includes configuration information related to the first access node 202.

Next, the central node 201 obtains, according to the obtained file information of the configuration file, the configuration file of the first access node 202 from a configuration server on which the configuration file is located.

Finally, the central node 201 sends the obtained configuration file to the first access node 202, and the first access node 202 performs configuration according to the received configuration file before running.

The virtual access node 201A may also be determined before the go-online notification is received.

Figure 10:
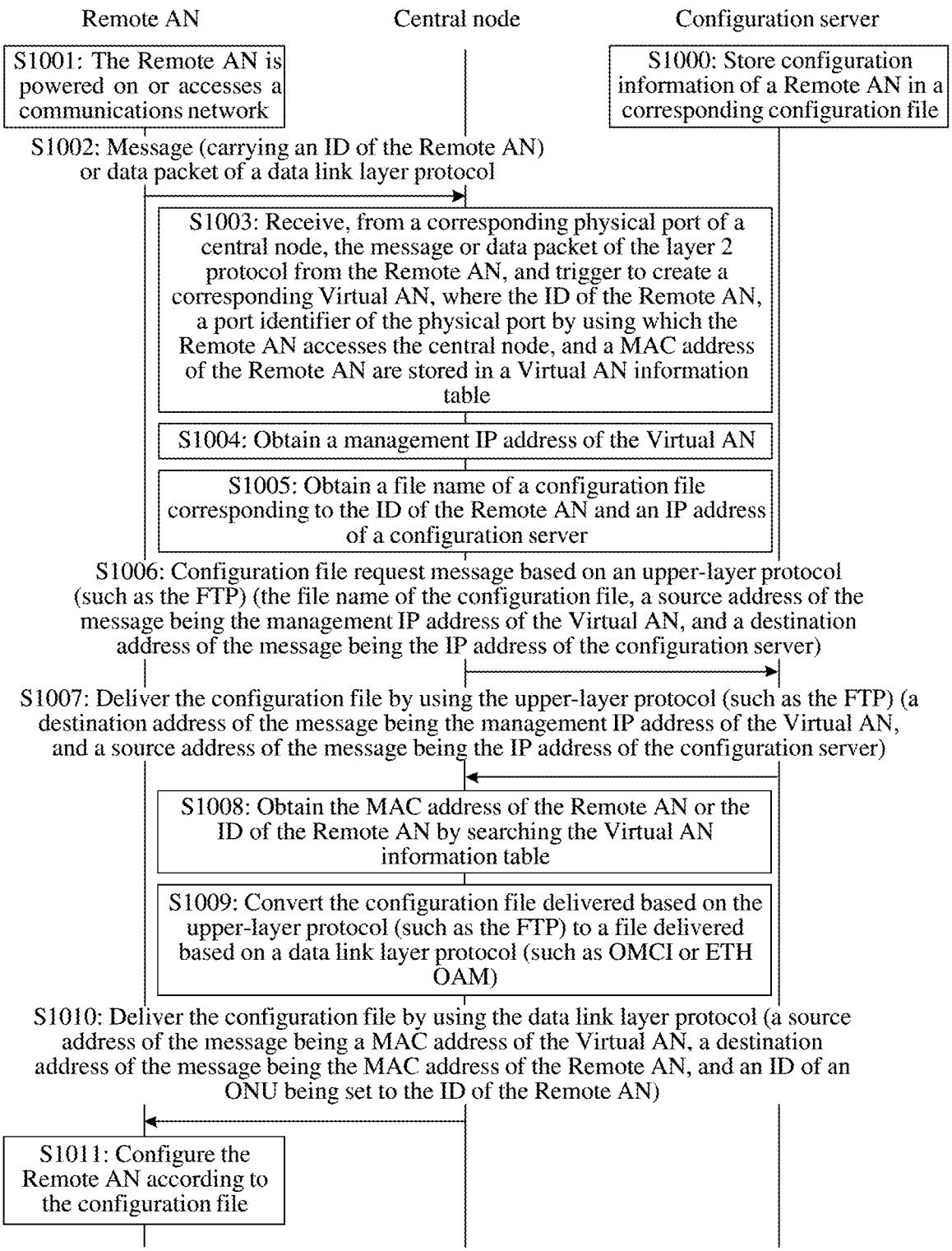
FIG. 10 is a flowchart of an embodiment.

For a message procedure of implementing plug-and-play of the first access node 202, refer to the following embodiment shown in FIG. 10.

In this embodiment, when the central node 201 communicates with the foregoing authentication server, and communicates with a DHCP server when obtaining the management IP address of the virtual access node 201A, an SDN controller or an IP Edge may be used as an agent or a relay.

When an SDN controller is used for forwarding, during communication between the central node 201 and the SDN controller, a message is carried on an OpenFlow channel and is sent based on an OpenFlow protocol or another protocol, for example, a tunnel protocol such as an IP tunnel protocol, or the Generic Routing Encapsulation (GRE) protocol, so that the message is transmitted to the SDN controller from the central node 201. In use, the foregoing protocol needs to be correspondingly extended to carry parameter information that needs to be carried in this embodiment, such as an identifier of the first access node 202 or the virtual access node, a port identifier of a physical port by using which the first access node 202 accesses the central node 201, and an identifier of a virtual port of the virtual access node.

A main difference between a case in which one virtual access node 201A corresponds to one first access node 202 and a case in which one virtual access node 201A corresponds to multiple first access nodes 202 lies in that in the latter case, the management IP address of the virtual access node 201A is obtained by using a DHCP process only when it is determined that no management IP address exists on the virtual access node 201A.

Different from the two different mapping relationships between virtual access nodes 201A and first access nodes 202, and in terms of whether the central node 201 communicates with the foregoing authentication server and DHCP server by using an SDN controller or an IP Edge, optional solutions of obtaining the management IP address and obtaining the file information of the configuration file corresponding to the first access node 202 and the IP address of the configuration server by the virtual access node 201A in the embodiments are separately described below by using embodiments shown in FIG. 11 to FIG. 14A and FIG. 14B.

In the embodiment shown in FIG. 11, the virtual access node 201A performs communication by using an SDN controller, and one virtual access node 201A corresponds to one first access node 202.

Figure 12:
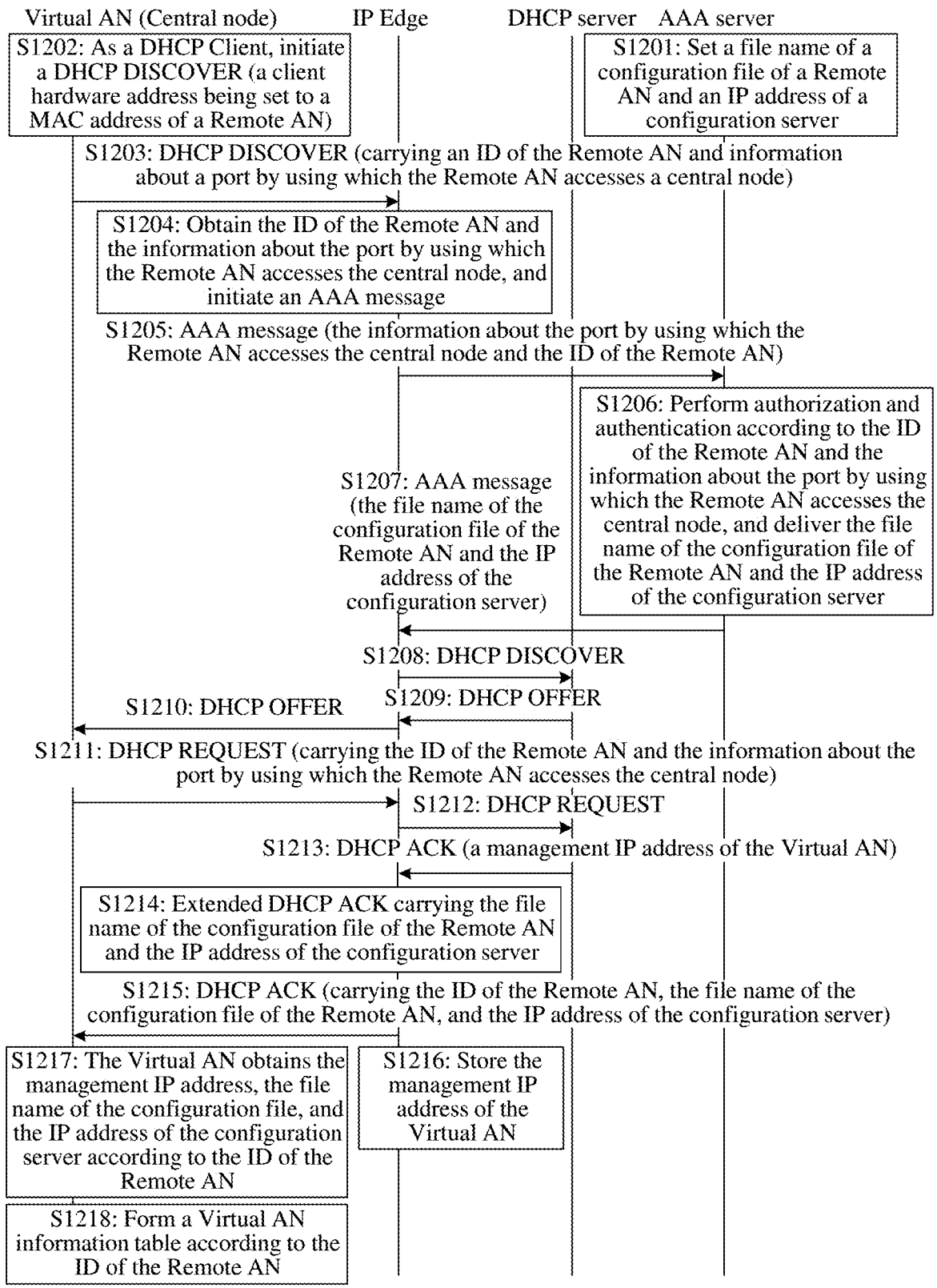
FIG. 12 is a flowchart of an embodiment.

In the embodiment shown in FIG. 12, the virtual access node 201A performs communication by using an IP Edge, and one virtual access node 201A corresponds to one first access node 202.

Figure 13A:
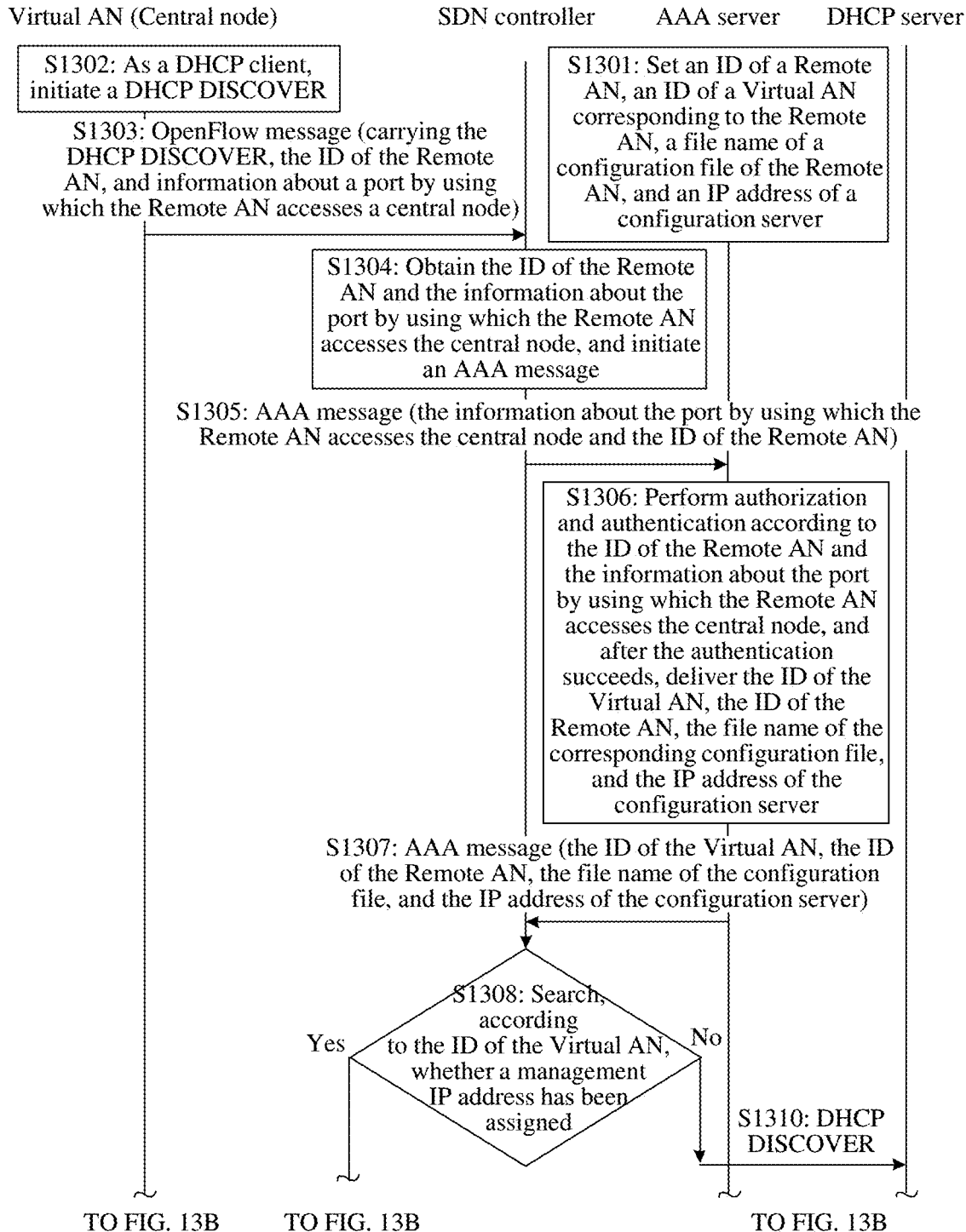
FIG. 13A and FIG. 13B are a flowchart of an embodiment.
Figure 13B:
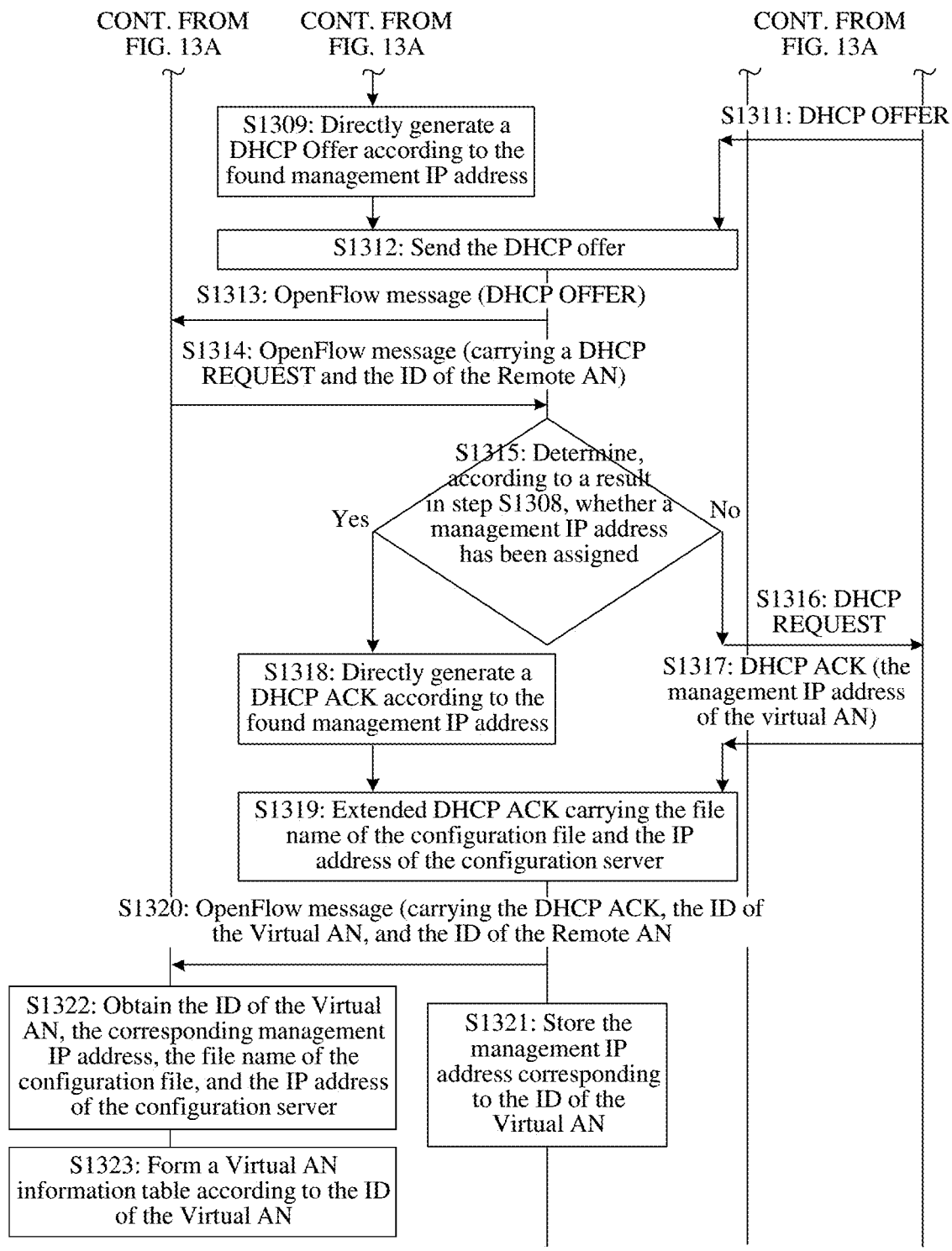

In the embodiment shown in FIG. 13A and FIG. 13B, the virtual access node 201A performs communication by using an SDN controller, and one virtual access node 201A corresponds to multiple first access nodes 202.

Figure 14A:
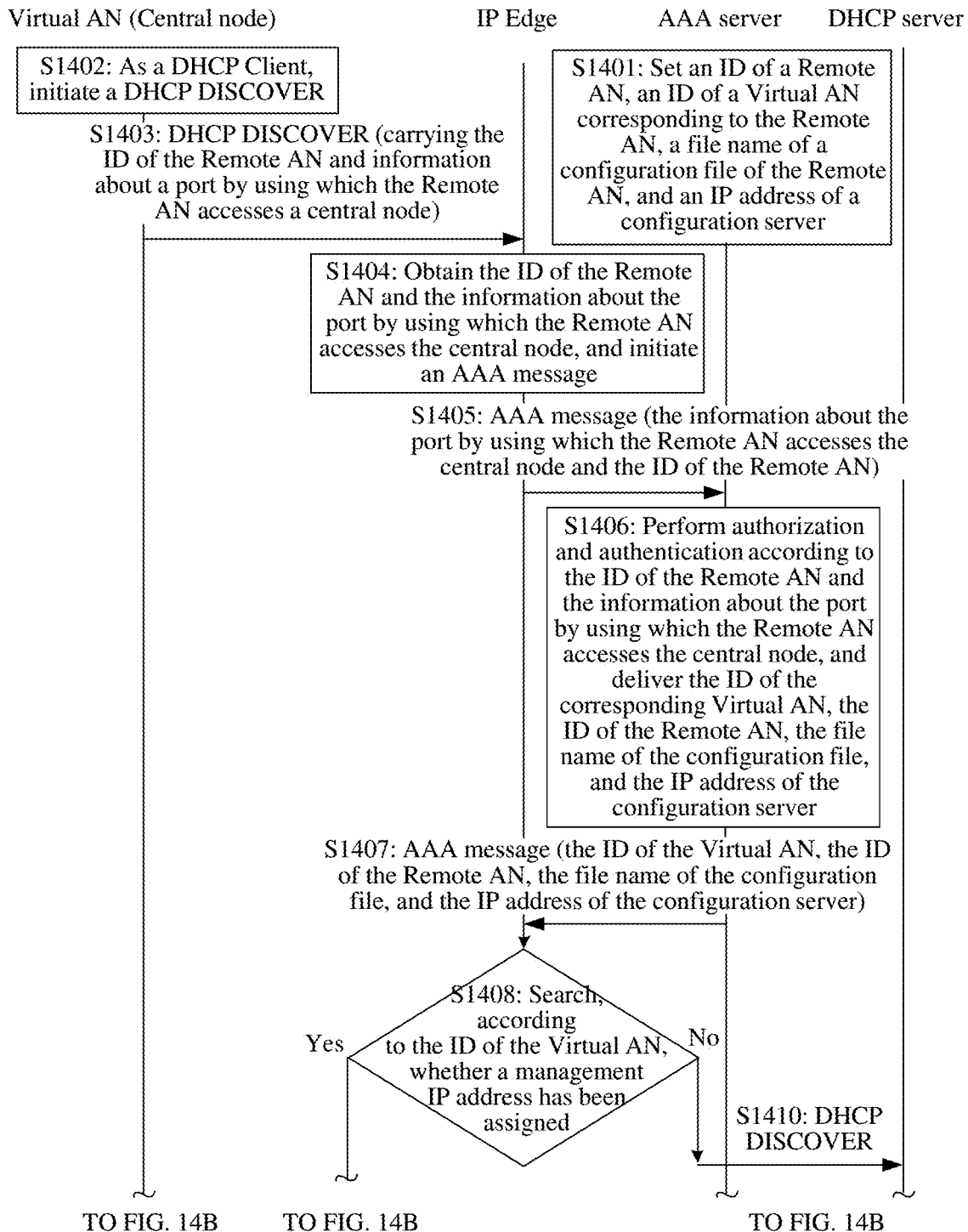
FIG. 14A and FIG. 14B are a flowchart of an embodiment.
Figure 14B:
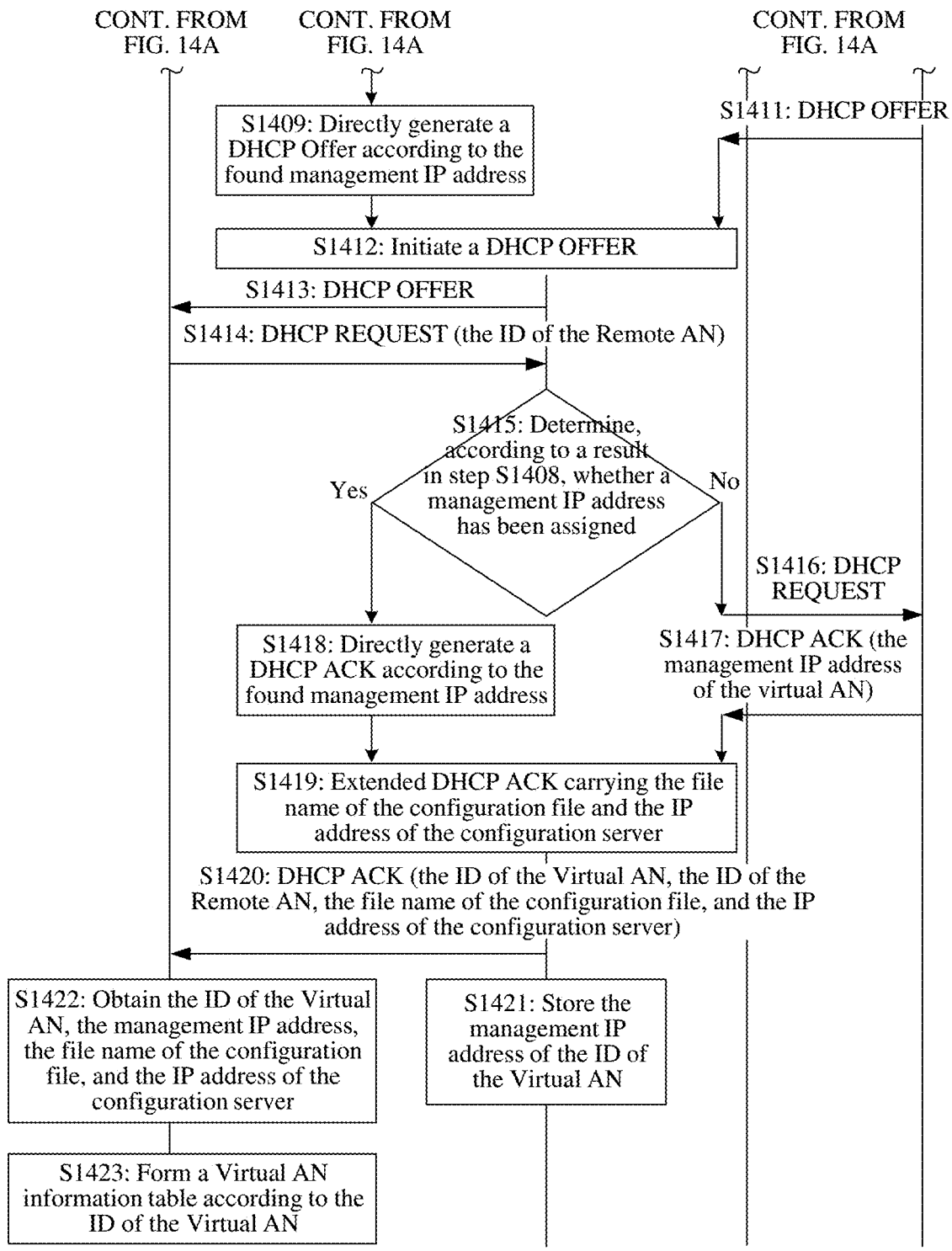

In the embodiment shown in FIG. 14A and FIG. 14B, the virtual access node 201A performs communication by using an IP Edge, and one virtual access node 201A corresponds to multiple first access nodes 202.

The communications network provided in the embodiments is described in detail above. Based on the same inventive idea, the embodiments further provide a central node and a first access node, and further provide two information processing methods. Because principles thereof are similar to that of the communications network for resolving technical problems provided in the embodiments, for implementation thereof, refer to the implementation of the communications network, and repeated content is no longer described in detail.

Figure 3:
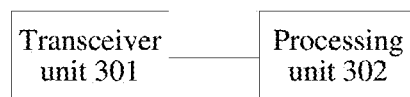
FIG. 3 is a schematic structural diagram of a first type of network node according to an embodiment.

FIG. 3 is a schematic structural diagram of a first type of network node on a communications network according to an embodiment. The first type of network node may be a first access node 202. As shown in FIG. 3, the network node includes: a transceiver unit 301, configured to: when the network node is powered on or accesses a network, send, to a central node such as a central node 201 on the network, a go-online notification indicating that the network node goes online, and receive configuration information that is returned by a virtual node on the central node in response to the go-online notification; and a processing unit 302, configured to configure the network node according to the configuration information received by the transceiver unit 301.

Optionally, the go-online notification is sent to the central node based on a first protocol, the configuration information is sent by the central node to the network node based on the first protocol, and the first protocol includes a physical layer protocol, a data link layer protocol, or an IP layer protocol.

Optionally, the configuration information includes a forwarding table entry.

Optionally, the network node and the central node are different physical devices.

The determining unit may determine that the network node accesses the network, if it is determined that the network node is connected to a virtual access node established on the central node; or the determining unit may determine that the network node accesses the network, if it is determined that the network node includes a first user-side port and that the network node is connected to a virtual access node established on the central node.

FIG. 3 may be construed as a schematic logical structural diagram of an access node such as a first access node or a remote access node (Remote AN) disclosed in the embodiments. The access node corresponding to FIG. 3 may execute all operations that can be executed by the access node disclosed in the embodiments. Among all the operations, the transceiver unit 301 may execute any one or more, or all of operations that are related to data receiving and sending, and the processing unit 302 may be configured to execute any one or more, or all of operations among all the operations except the operations executed by the transceiver unit 301.

Figure 4:
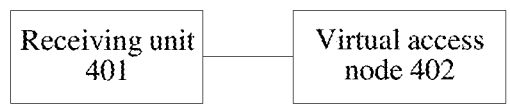
FIG. 4 is a schematic structural diagram of a second type of network node according to an embodiment.

FIG. 4 is a schematic structural diagram of a second type of network node according to an embodiment. The second type of network node may be a central node 201. As shown in FIG. 4, the network node includes: a receiving unit 401 and at least one virtual access node 402.

The receiving unit 401 is configured to receive a go-online notification indicating that a first access node such as a first access node 202 goes online.

The virtual access node 402 is configured to: after the receiving unit 401 receives the go-online notification, obtain configuration information of the first access node, and send the configuration information to the first access node.

Optionally, the virtual access node 402 is specifically configured to: determine file information of a configuration file that includes the configuration information; send a first IP packet used to request the configuration information, where a source IP address of the first IP packet is a management IP address of the virtual access node, and a destination IP address of the first IP packet is an IP address determined according to the file information; receive a second IP packet that carries the configuration information, where the second IP packet is a response packet of the first IP packet; and obtain the configuration information from the second IP packet.

Optionally, the virtual access node 402 is specifically configured to: receiving a DHCP message that carries the file information; and determine the file information of the configuration file according to the DHCP message.

Optionally, the file information in the DHCP message is inserted into the DHCP message by a DHCP server; or the file information in the DHCP message is inserted into the DHCP message by an intermediate network device between an AAA server and the network node.

Optionally, the file information includes an IP address of a configuration server and an identifier of the configuration file, the configuration server is a server that provides the configuration information, the destination IP address of the first IP packet is the IP address of the configuration server, and the first IP packet further includes the identifier of the configuration file; or the file information includes an IP address of a configuration server, an identifier of the configuration file, and an identifier of the configuration information, the configuration server is a server that provides the configuration information, the destination IP address of the first IP packet is the IP address of the configuration server, and the first IP packet further includes the identifier of the configuration file and the identifier of the configuration information; or the file information includes a URI of the configuration file, the destination IP address of the first IP packet is an IP address determined according to the URI, and the first IP packet further includes a storage path that is of the configuration file and that is determined according to the URI.

Optionally, the virtual access node 402 is specifically configured to: send, to a configuration server, a configuration information request message that includes an identifier of the first access node or includes an identifier of the virtual access node; and receive the configuration information of the first access node that is sent by the configuration server, where the configuration server is a server that provides the configuration information.

Optionally, the go-online notification is sent to the network node based on a first protocol, the configuration information is sent by the virtual access node 402 to the first access node based on the first protocol, and the first protocol includes a physical layer protocol, a data link layer protocol, or an IP layer protocol.

Optionally, a first format of the configuration information obtained by the virtual access node 402 conforms to a requirement of the IP layer protocol or conforms to a requirement of a protocol of a layer that is higher than an IP layer in an OSI model; and the virtual access node 402 is specifically configured to: convert the first format of the configuration information obtained by the virtual access node 402 to a second format that conforms to a requirement of the first protocol; and send, to the first access node, the configuration information that is in the second format.

Optionally, the receiving unit 401 is further configured to: establish the virtual access node 402 for the first access node; or determine the virtual access node 402 corresponding to the first access node in at least one virtual access node 402 established on the network node in advance.

Optionally, the virtual access node 402 is further configured to: before sending the configuration information to the first access node, send an authentication request for the first access node to an authentication server, and receive an authentication response indicating that the first access node is a legal node.

Optionally, the configuration information includes a forwarding table entry.

Optionally, the network node stores a correspondence between the virtual access node 402 and an access node group, the access node group includes the first access node, and the first access node and the network node are different physical devices.

FIG. 4 may be construed as a schematic logical structural diagram of a central node disclosed in the embodiments. The central node shown in FIG. 4 may execute some or all operations that can be executed by a central node disclosed in the embodiments. Among all the operations, the receiving unit 401 may execute any one or more, or all of operations that are related to data receiving, and the virtual access node 402 may be configured to execute operations executed by a virtual access node disclosed in the embodiments. The central node may further include a sending unit, configured to execute any one or more, or all of operations that are related to data sending among all the operations. The receiving unit 401 or the sending unit may be further configured to execute any operations of all the operations executed by a central node disclosed in the embodiments except the operations executed by the virtual access node.

Figure 16:
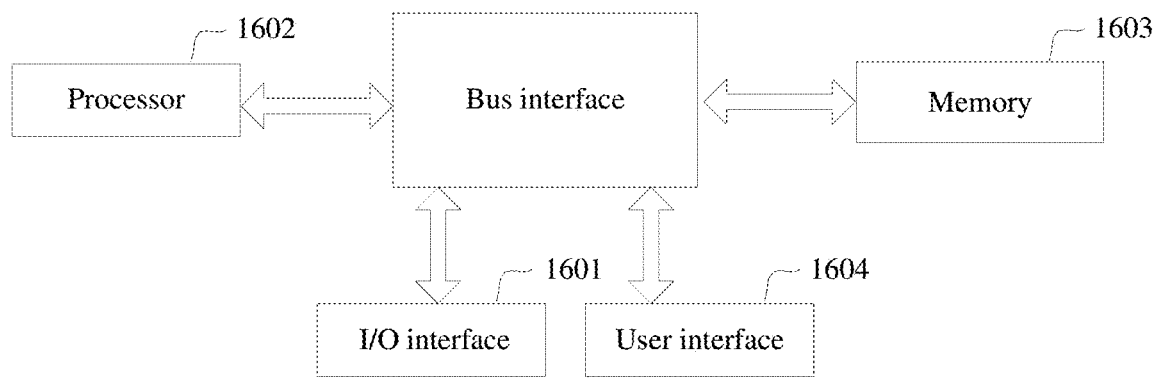
FIG. 16 is a schematic structural diagram of a third type of network node according to an embodiment.

FIG. 16 is a schematic structural diagram of a third type of network node according to an embodiment. As shown in FIG. 16, the apparatus includes: an input output (I/O) interface 1601 and a processor 1602.

The I/O interface 1601 is configured to receive a go-online notification indicating that a first access node goes online.

The processor 1602 is configured to: after the I/O interface 1601 receives the go-online notification, obtain configuration information of the first access node, and send the configuration information to the first access node.

In FIG. 16, a bus architecture may include any quantity of interconnected buses and bridges, and specifically connects various circuits such as one or more processors represented by the processor 1602 and an interface apparatus represented by the I/O interface 1601. The bus architecture may also connect various other circuits such as a peripheral device, a voltage regulator, and a power management circuit, which is known in the art and therefore is not further described in this specification. A bus interface provides an interface. A memory 1603 may include one or more storage units. For different user equipments, a user interface 1604 may further be an interface that can be externally or internally connected to a device needed. The connected device includes, but not limited to, a keyboard, a display, a loudspeaker, a microphone, a joystick, and the like.

Optionally, the processor 1602 is specifically configured to: determine file information of a configuration file that includes the configuration information; send a first IP packet used to request the configuration information, where a source IP address of the first IP packet is a management IP address of the processor 1602, and a destination IP address of the first IP packet is an IP address determined according to the file information; receive a second IP packet that carries the configuration information, where the second IP packet is a response packet of the first IP packet; and obtain the configuration information from the second IP packet.

Optionally, the processor 1602 is specifically configured to: receive a DHCP message that carries the file information; and determine the file information of the configuration file according to the DHCP message.

Optionally, the file information in the DHCP message is inserted into the DHCP message by a DHCP server; or the file information in the DHCP message is inserted into the DHCP message by an intermediate network device between an AAA server and the central node.

Optionally, the file information includes an IP address of a configuration server and an identifier of the configuration file, the configuration server is a server that provides the configuration information, the destination IP address of the first IP packet is the IP address of the configuration server, and the first IP packet further includes the identifier of the configuration file; or the file information includes an IP address of a configuration server, an identifier of the configuration file, and an identifier of the configuration information, the configuration server is a server that provides the configuration information, the destination IP address of the first IP packet is the IP address of the configuration server, and the first IP packet further includes the identifier of the configuration file and the identifier of the configuration information; or the file information includes a URI of the configuration file, the destination IP address of the first IP packet is an IP address determined according to the URI, and the first IP packet further includes a storage path that is of the configuration file and that is determined according to the URI.

Optionally, the processor 1602 is specifically configured to: send, to a configuration server, a configuration information request message that includes an identifier of the first access node or includes an identifier of the processor 1602; and receive the configuration information of the first access node that is sent by the configuration server, where the configuration server is a server that provides the configuration information.

Optionally, the go-online notification is sent to the network node based on a first protocol, the configuration information is sent by the processor 1602 to the first access node based on the first protocol, and the first protocol includes a physical layer protocol, a data link layer protocol, or an IP layer protocol.

Optionally, a first format of the configuration information obtained by the processor 1602 conforms to a requirement of the IP layer protocol or conforms to a requirement of a protocol of a layer that is higher than an IP layer in an OSI model; and the processor 1602 is specifically configured to: convert the first format of the configuration information obtained by the processor 1602 to a second format that conforms to a requirement of the first protocol; and send, to the first access node, the configuration information that is in the second format.

Optionally, the I/O interface 1601 is further configured to: establish the processor 1602 for the first access node; or determine the processor 1602 corresponding to the first access node in at least one processor 1602 established on the network node in advance.

Optionally, the processor 1602 is further configured to: before sending the configuration information to the first access node, send an authentication request for the first access node to an authentication server, and receive an authentication response indicating that the first access node is a legal node.

Optionally, the configuration information includes a forwarding table entry.

Optionally, the network node stores a correspondence between the processor 1602 and an access node group, the access node group includes the first access node, and the first access node and the network node are different physical devices.

It should be noted that FIG. 16 may be construed as a schematic physical structural diagram of a central node disclosed in the embodiments. The foregoing operations are some operations that can be executed by the central node corresponding to FIG. 16. The central node corresponding to FIG. 16 may further execute all operations that can be executed by an access node disclosed in the embodiments. The memory 1603 stores a readable instruction that can be executed by the processor 1602 and data that can be read by the processor 1602. The processor 1602 cooperates with the I/O interface and/or the user interface according to the readable instruction and the data, to perform all the operations that can be executed by the access node disclosed in the embodiments. Persons skilled in the art can write, according to operations that can be executed by the access node in the embodiments, the readable instruction stored in the memory 1603. Specifically, the memory 1603 may store a software module configured to implement the virtual access node, and the processor 1602 may implement, according to the software module, a virtual access node included in the central node in the embodiments.

Figure 21:
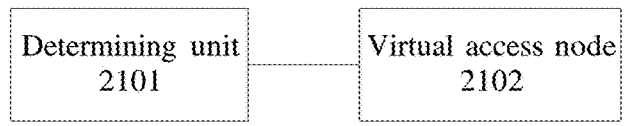
FIG. 21 is a schematic structural diagram of a network node according to an embodiment.
Figure 22:
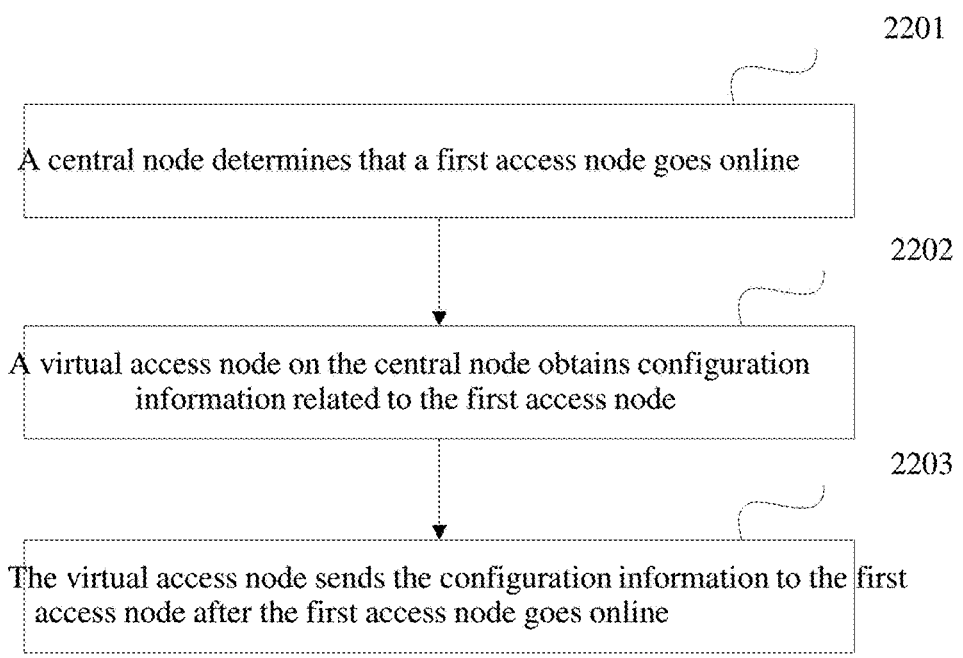
FIG. 22 is a flowchart of a method according to an embodiment.

FIG. 21 is a schematic structural diagram of a network node according to an embodiment. The network node may be a central node 201. As shown in FIG. 21, the network node includes: a determining unit 2101 and at least one virtual access node 2102. The determining unit 2101 is configured to determine that a first access node goes online. The virtual access node 2102 is configured to obtain configuration information related to the first access node, and after the first access node goes online, send the configuration information related to the first access node to the first access node.

The determining unit 2101 may determine, in multiple manners, that the first access node goes online. For example, the determining unit may determine that the first access node goes online, if it is determined that the first access node is already powered on; or the determining unit may determine that the first access node goes online, if it is determined that the first access node includes a first user-side port and that a communication connection is established between the first access node and the virtual access node.

The configuration information related to the first access node may include configuration information of the first access node, or may include configuration information of the first user-side port.

The virtual access node 2102 may obtain the configuration information related to the first access node by executing the following operations. The operations include: determining file information of a configuration file that includes the configuration information related to the first access node; sending a first IP packet used to request the configuration information related to the first access node, where a source IP address of the first IP packet is a management IP address of the virtual access node, and a destination IP address of the first IP packet is an IP address determined according to the file information; receiving a second IP packet that carries the configuration information related to the first access node, where the second IP packet is a response packet of the first IP packet; and obtaining the configuration information related to the first access node from the second IP packet.

The virtual access node 2102 may determine the file information of the configuration file by executing the following operations: receiving a DHCP message that carries the file information; and determining the file information of the configuration file according to the DHCP message.

The file information in the DHCP message may be inserted into the DHCP message by a DHCP server; or the file information in the DHCP message may be inserted into the DHCP message by an intermediate network device between an AAA server and the network node.

The file information includes an IP address of a configuration server and an identifier of the configuration file, the configuration server is a server that provides the configuration information related to the first access node, the destination IP address of the first IP packet is the IP address of the configuration server, and the first IP packet further includes the identifier of the configuration file; or the file information includes an IP address of a configuration server, an identifier of the configuration file, and an identifier of the configuration information related to the first access node, the configuration server is a server that provides the configuration information related to the first access node, the destination IP address of the first IP packet is the IP address of the configuration server, and the first IP packet further includes the identifier of the configuration file and the identifier of the configuration information related to the first access node; or the file information includes a uniform resource identifier (URI) of the configuration file, the destination IP address of the first IP packet is an IP address determined according to the URI, and the first IP packet further includes a storage path that is of the configuration file and that is determined according to the URI.

This embodiment already discloses a set of operations that are executed by the virtual access node 2102 to obtain the configuration information related to the first access node. In addition, the virtual access node 2012 may alternatively obtain the configuration information related to the first access node by executing the following operations: sending, to a configuration server, a configuration information request message that includes an identifier of the first access node or includes an identifier of the virtual access node; and receiving the configuration information related to the first access node that is sent by the configuration server, where the configuration server is a server that provides the configuration information related to the first access node.

In addition to the content already disclosed in this embodiment about the determining that the first access node goes online, the determining unit 2101 may be further configured to determine, according to a received go-online notification, that the first access node goes online. The go-online notification may be based on a first protocol, the virtual access node is configured to send the configuration information related to the first access node to the first access node based on the first protocol, and the first protocol includes a physical layer protocol, a data link layer protocol, or an IP layer protocol.

A first format of the configuration information related to the first access node that is obtained by the virtual access node 2102 conforms to a requirement of the IP layer protocol or conforms to a requirement of a protocol of a layer that is higher than an IP layer in an OSI model. In this case, the virtual access node is configured to: convert the first format of the configuration information related to the first access node that is obtained by the virtual access node to a second format that conforms to a requirement of the first protocol; and send, to the first access node, the configuration information related to the first access node that is in the second format.

The virtual access node 2102 may be established by the determining unit, or may be determined by the determining unit in at least one virtual access node established on the network node in advance.

The virtual access node 2102 may be further configured to: before sending the configuration information related to the first access node to the first access node, send an authentication request for the first access node to an authentication server, and receive an authentication response indicating that the first access node is a legal node.

In this embodiment, the configuration information related to the first access node may include a forwarding table entry. The network node may store a correspondence between the virtual access node and an access node group, the access node group includes the first access node, and the first access node and the network node are different physical devices.

FIG. 21 may be construed as a schematic logical structural diagram of a central node disclosed in the embodiments. The central node shown in FIG. 21 may execute all operations that can be executed by a central node disclosed in the embodiments. Among all the operations, the determining unit 2101 may execute any one or more, or all of operations that are related to determining that the first access node goes online, and the virtual access node 2102 may be configured to execute operations executed a virtual access node disclosed in the embodiments. When the determining unit 2101 determines, according to the received go-online notification, that the first access node goes online, the determining unit 2101 may be construed as including the receiving unit 401 shown in FIG. 4, or may be construed as being equivalent to the receiving unit 401 shown in FIG. 4.

Figure 17:
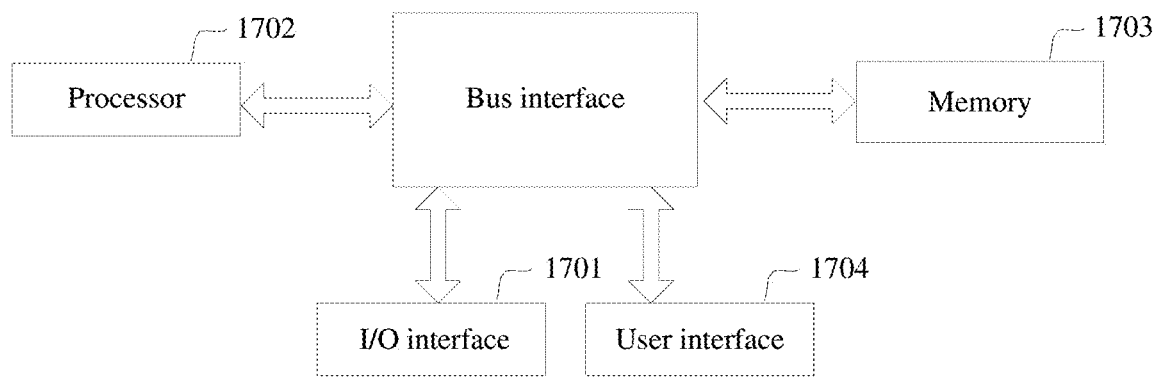
FIG. 17 is a schematic structural diagram of a fourth type of network node according to an embodiment.

FIG. 17 is a schematic structural diagram of a fourth type of network node according to an embodiment. As shown in FIG. 17, the network node includes: an I/O interface 1701, configured to: when the network node is powered on or accesses a network, send, to a central node on the network, a go-online notification indicating that the network node goes online; and receive configuration information that is returned by the central node in response to the go-online notification; and a processor 1702, configured to configure the network node according to the configuration information received by the I/O interface 1701.

In FIG. 17, a bus architecture may include any quantity of interconnected buses and bridges, and specifically connects various circuits such as one or more processors represented by the processor 1702 and an interface apparatus represented by the I/O interface 1701. The bus architecture may also connect various other circuits such as a peripheral device, a voltage regulator, and a power management circuit, which is known in the art and therefore is not further described in this specification. A bus interface provides an interface. A memory 1703 may include one or more storage units. For different user equipments, a user interface 1704 may further be an interface that can be externally or internally connected to a device needed. The connected device includes, but not limited to, a keyboard, a display, a loudspeaker, a microphone, a joystick, and the like.

Optionally, the go-online notification is sent to the central node based on a first protocol, the configuration information is sent by the central node to the network node based on the first protocol, and the first protocol includes a physical layer protocol, a data link layer protocol, or an IP layer protocol.

Optionally, the configuration information includes a forwarding table entry.

Optionally, the network node and the central node are different physical devices.

FIG. 17 may be construed as a schematic physical structural diagram of an access node such as a first access node or a remote access node (Remote AN) disclosed in the embodiments. The access node corresponding to FIG. 17 may execute all operations that can be executed by the access node disclosed in the embodiments. The memory 1703 stores a readable instruction that can be executed by the processor 1702 and data that can be read by the processor 1702. The processor 1702 cooperates with the I/O interface and/or the user interface according to the readable instruction and the data, to perform all the operations that can be executed by the access node disclosed in the embodiments. Persons skilled in the art can write, according to operations that can be executed by the access node in the embodiments, the readable instruction stored in the memory 1703.

Figure 5:
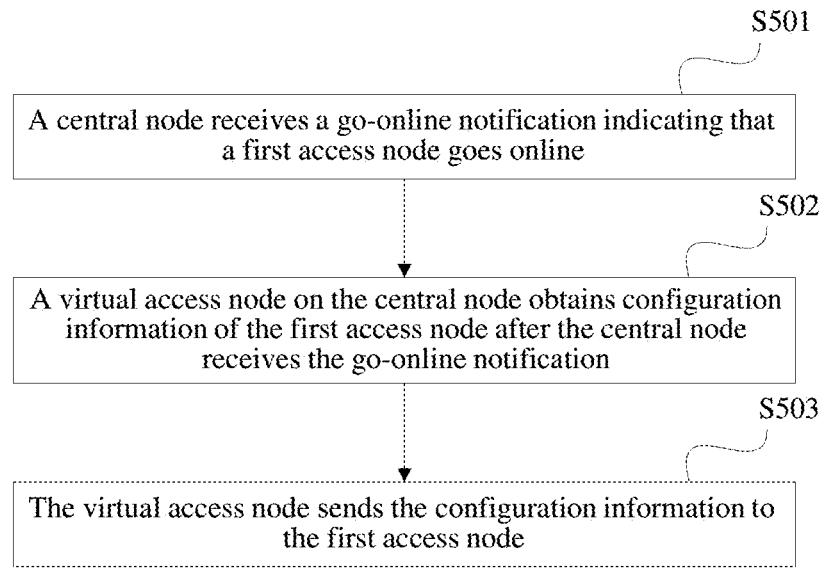
FIG. 5 is a flowchart of a first information processing method according to an embodiment.

FIG. 5 is a flowchart of a first information processing method according to an embodiment. As shown in FIG. 5, the method includes.

S501: A central node receives a go-online notification indicating that a first access node goes online.

S502: A virtual access node on the central node obtains configuration information of the first access node after the central node receives the go-online notification.

S503. The virtual access node sends the configuration information to the first access node.

Configuration information of a user-side port of the first access node may belong to the configuration information of the first access node.

Moreover, the configuration information of the first access node may alternatively be obtained before the central node receives the go-online notification.

Optionally, the obtaining, by a virtual access node, configuration information of the first access node in step S502 includes: determining file information of a configuration file that includes the configuration information; sending a first IP packet used to request the configuration information, where a source IP address of the first IP packet is a management IP address of the virtual access node, and a destination IP address of the first IP packet is an IP address determined according to the file information; receiving a second IP packet that carries the configuration information, where the second IP packet is a response packet of the first IP packet; and obtaining the configuration information from the second IP packet.

Optionally, the determining file information of a configuration file that includes the configuration information in the foregoing step S502 includes: receiving a DHCP message that carries the file information; and determining the file information of the configuration file according to the DHCP message.

The file information in the DHCP message is inserted into the DHCP message by a DHCP server; or the file information in the DHCP message is inserted into the DHCP message by an intermediate network device between an AAA server and the central node.

Optionally, the file information includes an IP address of a configuration server and an identifier of the configuration file, the configuration server is a server that provides the configuration information, the destination IP address of the first IP packet is the IP address of the configuration server, and the first IP packet further includes the identifier of the configuration file; or the file information includes an IP address of a configuration server, an identifier of the configuration file, and an identifier of the configuration information, the configuration server is a server that provides the configuration information, the destination IP address of the first IP packet is the IP address of the configuration server, and the first IP packet further includes the identifier of the configuration file and the identifier of the configuration information; or the file information includes a URI of the configuration file, the destination IP address of the first IP packet is an IP address determined according to the URI, and the first IP packet further includes a storage path that is of the configuration file and that is determined according to the URI.

Alternatively, optionally, the obtaining, by a virtual access node, configuration information of the first access node in step S502 includes: sending, to a configuration server, a configuration information request message that includes an identifier of the first access node or includes an identifier of the virtual access node; and receiving the configuration information of the first access node that is sent by the configuration server, where the configuration server is a server that provides the configuration information.

Optionally, in step S501, the go-online notification received by the central node is sent to the central node based on a first protocol, the configuration information is sent by the virtual access node to the first access node based on the first protocol, and the first protocol includes a physical layer protocol, a data link layer protocol, or an IP layer protocol.

Optionally, in step S502, a first format of the configuration information obtained by the virtual access node conforms to a requirement of the IP layer protocol or conforms to a requirement of a protocol of a layer that is higher than an IP layer in an Open System Interconnection (OSI) model.

The sending, by the virtual access node, the configuration information to the first access node in step S503 includes: converting the first format of the configuration information obtained by the virtual access node to a second format that conforms to a requirement of the first protocol; and sending, to the first access node, the configuration information that is in the second format.

Optionally, after the receiving, by a central node, a go-online notification, and before the obtaining, by a virtual access node, configuration information related to the first access node, the method further includes: establishing the virtual access node; or determining the virtual access node in at least one virtual access node established on the central node in advance.

Optionally, before the sending, by the virtual access node, the configuration information to the first access node in step S503, the method further includes: sending, by the virtual access node, an authentication request for the first access node to an authentication server; and receiving, by the virtual access node, an authentication response indicating that the first access node is a legal node.

Optionally, the configuration information includes a forwarding table entry.

Optionally, the central node stores a correspondence between the virtual access node and an access node group, the access node group includes the first access node, and the first access node and the central node are different physical devices.

Figure 6:
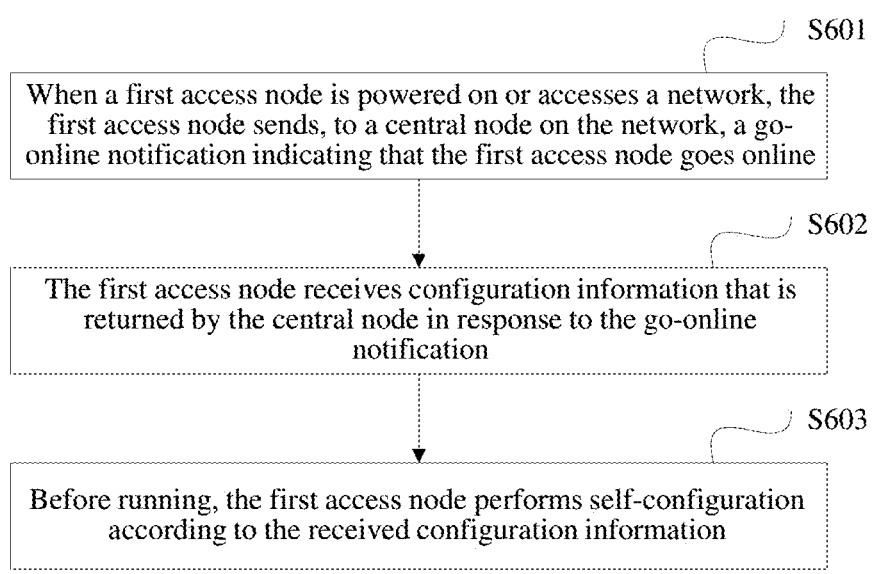
FIG. 6 is a flowchart of a second information processing method according to an embodiment.

FIG. 6 is a flowchart of a second information processing method according to an embodiment. As shown in FIG. 6, the method includes.

601: When a first access node is powered on or accesses a network, the first access node sends, to a central node on the network, a go-online notification indicating that the first access node goes online.

S602: The first access node receives configuration information that is returned by the central node in response to the go-online notification.

S603: Before running, the first access node performs self-configuration according to the received configuration information.

Optionally, the go-online notification is sent to the central node based on a first protocol, the configuration information is sent by the central node to the first access node based on the first protocol, and the first protocol includes a physical layer protocol, a data link layer protocol, or an IP layer protocol.

Optionally, the configuration information includes a forwarding table entry.

Optionally, the first access node and the central node are different physical devices.

The communications network and two types of network nodes, that is, the central node and the first access node, provided in the embodiments are described above. To resolve a problem that authentication on an identity of a device user on a communications network usually cannot prevent an invalid node from accessing the communications network, and as a result, there may be a large quantity of invalid nodes on the communications network, the embodiments further provide an authentication server and an authentication method, which are described in detail below.

Figure 7:
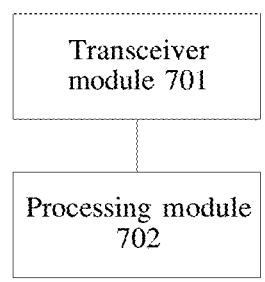
FIG. 7 is a schematic structural diagram of an authentication server according to an embodiment.

FIG. 7 is a schematic structural diagram of an authentication server according to an embodiment. As shown in FIG. 7, the authentication server includes: a transceiver module 701, configured to receive an authentication request that requests to perform authentication on whether a particular node is a legal node; and a processing module 702, configured to determine whether the particular node is a legal node, where the transceiver module 701 is further configured to: after the processing module 702 determines that the particular node is a legal node, send an authentication response indicating that the particular node is a legal node.

Optionally, the processing module 702 is further configured to determine file information of a configuration file that includes configuration information of the particular node; and the transceiver module 701 is further configured to send the file information by using the authentication response.

Optionally, the authentication request includes a node identifier of the particular node, and the processing module 702 is specifically configured to determine whether a node corresponding to the node identifier is a legal node; or the authentication request includes a node identifier of the particular node and a port identifier of a port by using which the particular node is connected to an upper-level node, and the processing module 702 is specifically configured to determine whether a node corresponding to an identifier combination of the node identifier and the port identifier of the port is a legal node.

Figure 18:
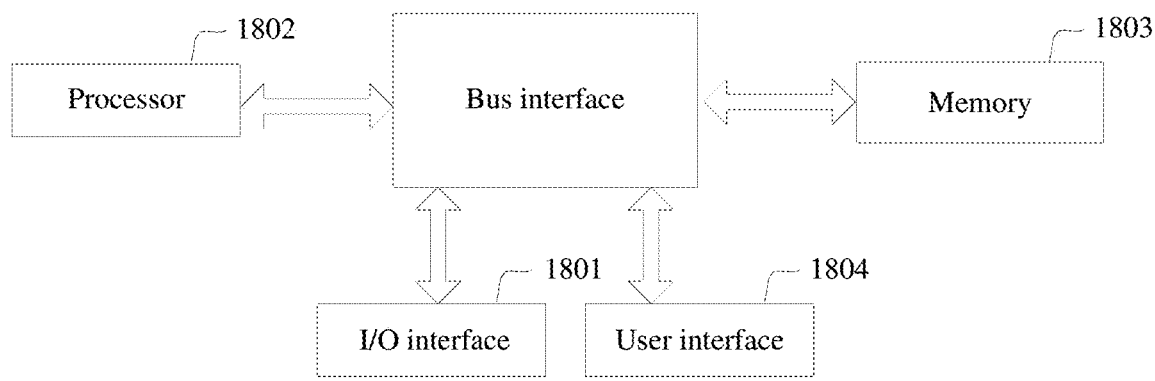
FIG. 18 is a schematic structural diagram of an authentication server according to an embodiment.

FIG. 18 is a schematic structural diagram of an authentication server according to an embodiment. As shown in FIG. 18, the authentication server includes: an I/O interface 1801, configured to receive an authentication request that requests to perform authentication on whether a particular node is a legal node; and a processor 1802, configured to determine whether the particular node is a legal node, where the I/O interface 1801 is further configured to: after the processor 1802 determines that the particular node is a legal node, send an authentication response indicating that the particular node is a legal node.

In FIG. 18, a bus architecture may include any quantity of interconnected buses and bridges, and specifically connects various circuits such as one or more processors represented by the processor 1802 and an interface apparatus represented by the I/O interface 1801. The bus architecture may also connect various other circuits such as a peripheral device, a voltage regulator, and a power management circuit, which is known in the art and therefore is not further described in this specification. A bus interface provides an interface. A memory 1803 may include one or more storage units. For different user equipments, a user interface 1804 may further be an interface that can be externally or internally connected to a device needed. The connected device includes, but not limited to, a keyboard, a display, a loudspeaker, a microphone, a joystick, and the like.

Optionally, the processor 1802 is further configured to determine file information of a configuration file that includes configuration information of the particular node; and the I/O interface 1801 is further configured to send the file information by using the authentication response.

Optionally, the authentication request includes a node identifier of the particular node, and the processor 1802 is specifically configured to determine whether a node corresponding to the node identifier is a legal node; or the authentication request includes a node identifier of the particular node and a port identifier of a port by using which the particular node is connected to an upper-level node, and the processor 1802 is specifically configured to determine whether a node corresponding to an identifier combination of the node identifier and the port identifier of the port is a legal node.

Figure 8:
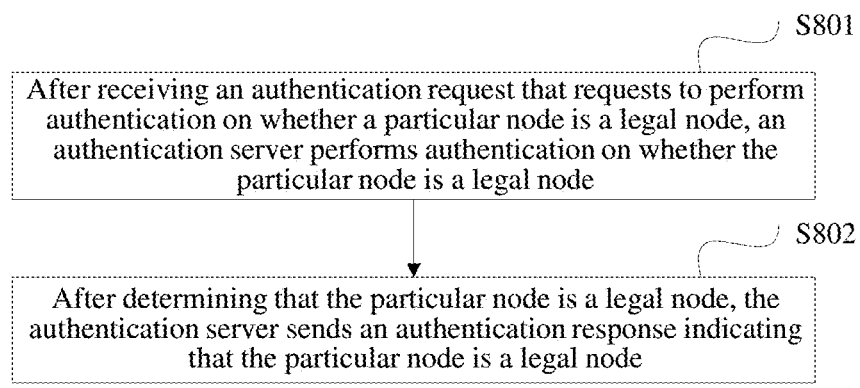
FIG. 8 is a flowchart of an authentication method according to an embodiment.

FIG. 8 is a flowchart of an authentication method according to an embodiment. As shown in FIG. 8, the method includes.

S801: After receiving an authentication request that requests to perform authentication on whether a particular node is a legal node, an authentication server performs authentication on whether the particular node is a legal node.

S802: After determining that the particular node is a legal node, the authentication server sends an authentication response indicating that the particular node is a legal node.

Optionally, after the determining, by the authentication server, that the particular node is a legal node in step S801, and before the sending, by the authentication server, an authentication response in step S802, the method further includes: determining, by the authentication server, file information of a configuration file that includes configuration information of the particular node.

The sending, by the authentication server, an authentication response in step S802 includes: sending, by the authentication server, the file information by using the authentication response.

Optionally, the authentication request includes a node identifier of the particular node, and the performing, by an authentication server, authentication on whether the particular node is a legal node includes: determining, by the authentication server, whether a node corresponding to the node identifier is a legal node; or the authentication request includes a node identifier of the particular node and a port identifier of a port by using which the particular node is connected to an upper-level node, and the performing, by an authentication server, authentication on whether the particular node is a legal node includes: determining, by the authentication server, whether a node corresponding to an identifier combination of the node identifier and the port identifier of the port is a legal node.

It should be noted that, the particular node in the authentication server and the authentication method provided in the embodiments may be the second type of network node, that is, a first access node, provided in the embodiments, or may be the first type of network node, that is, a virtual access node on a central node, provided in the embodiments.

If the particular node is a first access node, the node identifier of the particular node is a node identifier of the first access node, and the port identifier of the port of the particular node is a port identifier of a physical port by using which the first access node is connected to a central node; and if the particular node is a virtual access node on a central node, the node identifier of the particular node is a node identifier of the virtual access node, and the port identifier of the port of the particular node is a port identifier of a virtual port of the virtual access node.

The communications network, two types of network nodes, the authentication server, and the authentication method provided in the embodiments are described above, and for ease of understanding and implementation, specific embodiments are further described below.

The following embodiments are described by using an example in which a remote access node is a first access node.

FIG. 9 is a schematic diagram of a communications network according to an embodiment.

FIG. 10 is a flowchart of implementing plug-and-play of a remote access node according to an embodiment.

FIG. 11 to FIG. 14A and FIG. 14B are flowcharts of four examples of obtaining a management IP address and file information of a configuration file of a remote access node by a virtual access node disclosed in the embodiments.

FIG. 15 is a flowchart of configuring a forwarding table according to an embodiment.

The embodiments are described in detail below one by one.

FIG. 9 is a diagram of a network topology of an optional access network according to an embodiment.

As shown in FIG. 9, on the optical access network, a remote access node includes: a CPE, a CM, an ONT, an ONU, a CMTS, a CCAP, an MxU, or a DSLAM, and the remote access node is connected to a central node.

The central node includes a protocol conversion unit, configured to convert configuration information of the remote access node that is obtained by a virtual access node and that is based on a protocol of a layer higher than an IP layer to configuration information that is based on a data link layer protocol or an IP layer protocol.

The central node further includes a virtual access node corresponding to each remote access node, for example, a virtual access node (AN) such as a virtual CPE, a virtual CM, or a virtual ONT corresponding to a CPE, a CM, or an ONT, a virtual AN such as a virtual CMC, a virtual CMTS, or a virtual CCAP corresponding to a CMC, a CMTS, or a CCAP, or a virtual AN such as a virtual MxU corresponding to an MxU and an ONU. The virtual access node corresponds to two remote access nodes.

The central node communicates with an AAA server, a DHCP server, and a configuration server by using an IP edge node or an SDN controller. If the central node is connected to an SDN controller, optionally, a message communicated between the central node and each of the foregoing servers is sent over an OpenFlow channel.

In FIG. 9, a message is sent between the central node and the remote access node based on a data link layer, that is, a layer 2 protocol, so that the remote access node does not need to support an upper-layer protocol. Therefore, implementation complexity of the remote access node is reduced, and power consumption of the remote access node and costs of the remote access node are reduced.

In FIG. 9, the AAA server is configured to perform authentication on a remote access node, and stores a correspondence between an identifier of a remote access node and file information of a configuration file of the remote access node. After a remote access node has been authenticated by the AAA server, the AAA server sends file information of a configuration file of the remote access node to a virtual access node corresponding to the remote access node. After obtaining the configuration file according to the file information, the virtual access node sends the configuration file to the remote access node based on the data link layer protocol, and the remote access node can run after performing self-configuration according to the received configuration file. Therefore, automatic configuration of a remote access node is implemented, and complexity in maintaining a large quantity of remote access nodes is reduced. FIB (Forwarding Information Base).

The DHCP server in FIG. 9 is configured to assign a management IP address to each virtual access node, and no longer needs to assign a management IP address to each remote access node. When multiple remote access nodes correspond to one virtual access node, IP address resources are saved.

The configuration server stores a configuration file of each remote access node, and a virtual access node communicates with the configuration server by using its management IP address, so as to obtain a configuration file of a remote access node corresponding to the virtual access node.

In the embodiment shown in FIG. 10, a remote access node (Remote AN) communicates with a central node based on a data link layer protocol. After receiving a go-online notification sent by a remote access node, the central node records related information of the remote access node in a Virtual AN information table such as Table 1 or Table 2. After obtaining a configuration file of a remote access node, the central node finds the remote access node in the Virtual AN information table, and forwards the configuration file to the found remote access node.

The embodiment shown in FIG. 10 includes the following steps.

S1000: A configuration server stores configuration information of a Remote AN in a configuration file of the configuration server.

S1001: The Remote AN is powered on or accesses a communications network.

S1002: The Remote AN automatically initiates a message of a data link layer protocol or sends another packet to notify a central node that the Remote AN goes online. For a gigabit passive optical network (GPON) or a next-generation GPON, the data link layer protocol may be an OMCI protocol. For an Ethernet passive optical network (EPON), a next-generation EPON, or an Ethernet, the data link layer protocol may be an Ethernet management channel protocol or an Ethernet OAM protocol.

The message of the data link layer protocol or the another packet sent to the central node carries an ID of the Remote AN or a MAC address of the Remote AN. When only the MAC address of the Remote AN is carried, the MAC address of the Remote AN may be used as an identifier of the Remote AN.

S1003: The central node receives, from a port by using which the Remote AN and the central node are connected, the message of the data link layer protocol or the another packet from the Remote AN, and triggers to create a corresponding Virtual AN, where the central node determines that no Virtual AN corresponding to the Remote AN exists, and stores the ID of the Remote AN, a port identifier of a physical port by using which the Remote AN accesses or is connected to the central node, and the MAC address of the Remote AN in a Virtual AN information table.

S1004: The central node obtains a management IP address of the Virtual AN, and records the management IP address in the Virtual AN information table.

S1005: The central node obtains a file name of a configuration file corresponding to the ID of the Remote AN and an IP address of a configuration server, or a URI corresponding to the configuration file, and records the file name and the IP address or the URI in the Virtual AN information table.

Optionally, in step S1003, when triggering to create the Virtual AN corresponding to the Remote AN, the central node determines by itself a port identifier of a virtual port of the Virtual AN, or obtains a port identifier of a virtual port of the Virtual AN from a network server, such as an OSS, an NMS, an SDN controller, or an AAA server, connected to the central node. Therefore, optionally, the central node may further store the port identifier of the virtual port of the Virtual AN in the Virtual AN information table.

By means of steps S1004 and S1005, the following Virtual AN information tables shown in Table 1 and Table 2 are formed. Table 1 is a Virtual AN information table when one virtual access node corresponds to one remote access node, and Table 2 is a Virtual AN information table when one virtual access node corresponds to multiple remote access nodes. In Table 2, one Virtual AN corresponds to multiple Remote ANs, but corresponds to only one management IP address.

By means of steps S1004 and S1005, the Virtual AN corresponding to the Remote AN is created on the central node. When receiving a packet that is from the Remote AN and that carries a port identifier of a physical port by using which the Remote AN accesses the central node, the Virtual AN should convert the port identifier of the physical port by using which the Remote AN accesses the central node to a port identifier of a virtual port of the corresponding Virtual AN according to the Virtual AN information table shown in Table 1 or Table 2. Alternatively, when receiving a packet that is sent to the Remote AN and that carries a port identifier of a virtual port of the Virtual AN, the Virtual AN should convert, according to the Virtual AN information table shown in Table 1 or Table 2, the port identifier of the virtual port of the Virtual AN to a corresponding port identifier of a physical port by using which the Remote AN accesses the central node.

In Table 1, because one Virtual AN corresponds to one Remote AN, the column "Port identifier of virtual port of Virtual AN" is an optional item, that is, a port identifier of a virtual port of a Virtual AN is the same as a port identifier of a physical port of a corresponding Remote AN. Similarly, the column "ID of Virtual AN" is also an optional item.

TABLE 1

Virtual AN information table when one Virtual AN corresponds to one Remote AN

| ID of Remote AN | Port identifier of physical port by using which a Remote AN accesses a central node | MAC address of Remote AN | Management IP address | File name of configuration file | IP address of configuration server | ID of Virtual AN | Port identifier of virtual port of Virtual AN |
|---|---|---|---|---|---|---|---|
| OLT ID 1 | slot (slot) number 1 and port (port) number 1 | 111111 | 192.168.1.1 | A | 10.71.47.175 | 1 | slot (slot) number 2 and port (port) number 2 |

Although only one Remote AN is shown in Table 1, the central node may be connected to multiple Remote ANs, and Table 1 shown above is for exemplary purpose only.

TABLE 2

Virtual AN information table when one Virtual AN corresponds to multiple Remote ANs

| ID of Virtual AN | Port identifier of virtual port of Virtual AN | ID of Remote AN | Port identifier of physical port by using which a Remote AN accesses a central node | MAC address of Remote AN | Management IP address | File name of configuration file | IP address of configuration server |
|---|---|---|---|---|---|---|---|
| 1 | slot (slot) number 3 and port (port) number 3 | OLT ID1 | slot (slot) number 1 and port (port) number 1 | 111111 | 192.168.1.1 | A | 10.71.47.175 |
|  | slot (slot) number 4 and port (port) number 4 | OLT ID2 | slot (slot) number 2 and port (port) number 2 | 222222 |  | B | 100.10.2.3 |

S1006: The Virtual AN initiates one or more configuration file request messages that are based on an upper-layer protocol such as the FTP or the CPE wide area network (WAN) Management Protocol TR069, according to the management IP address, the file name of the configuration file, and the IP address of the configuration server that are obtained. One Virtual AN may correspond to file names of multiple configuration files and IP addresses of multiple configuration servers or multiple URIs. In this case, the Virtual AN needs to initiate multiple request configuration file messages.

The configuration file request message carries the file name of the configuration file or the URI, a source address of the message is the management IP address of the Virtual AN, and a destination address of the message is the IP address of the configuration server.

S1007: The configuration server finds the configuration file according to the file name of the configuration file or the URI, and delivers the configuration file by using the upper-layer protocol such as the FTP, where a destination address of the message is the management IP address of the Virtual AN, and a source address of the message is the IP address of the configuration server.

S1008: The Virtual AN obtains the MAC address of the Remote AN or the ID of the Remote AN according to the Virtual AN information table.

S1009: The Virtual AN converts a file delivery protocol that is based on the upper-layer protocol such as the FTP to a file delivery protocol that is based on a data link layer protocol such as an OMCI, Ethernet management channel, or ETH (Ethernet) OAM protocol.

S1010: The Virtual AN delivers one or more configuration files to one or more Remote ANs based on the data link layer protocol.

A source address of the message is a MAC address of the Virtual AN, and a destination address of the message is the MAC address of the Remote AN. If the Remote AN is an ONU or an ONT, an ID of the ONU needs to be set to the ID of the Remote AN, and the ID of the ONU is then added to a PON frame.

S111: The Remote AN configures the Remote AN according to configuration information in the configuration file.

The embodiment shown in FIG. 11 provides a first example of obtaining a management IP address and file information of a configuration file of a remote access node by a virtual access node. In this example, the virtual access node performs communication by using an SDN controller, and one virtual access node corresponds to one remote access node.

The embodiment shown in FIG. 11 includes the following steps.

S1101: Set a Remote AN/Virtual AN information table shown in Table 3 on an AAA server. As described above, a Remote AN/Virtual AN may be preset on the AAA server when an operator of a communications network performs network planning. In a specific implementation, a file name of a configuration file and an IP address of a configuration server in the table may also be replaced with a URI corresponding to the configuration file.

TABLE 3

Remote AN/Virtual AN information table

| ID of Remote AN/ID of Virtual AN | Information about port (for example: port identifier of physical port) by using which a Remote AN accesses a central node or information about virtual port of Virtual AN | File name of configuration file | IP address of configuration server |
|---|---|---|---|
| OLT ID 1 | slot (slot) number 1 and port (port) number 1 | A | 10.71.47.175 |
| ... | ... | ... | ... |

S1102: As a DHCP client, a Virtual AN initiates a DHCP discovery message, where a client hardware address in the message is set to a MAC address of a Remote AN.

S1103: The Virtual AN adds the DHCP DISCOVER message to an OpenFlow message, that is, sends the DHCP DISCOVER message over an OpenFlow channel.

The OpenFlow message carries the DHCP DISCOVER message, an ID of the Remote AN or an ID of the Virtual AN, and information about a port by using which the Remote AN accesses a central node or information about a virtual port of the Virtual AN, and is sent to an SDN controller. The ID of the Virtual AN may be carried because the Virtual AN may be assigned by the central node to the Remote AN or may be obtained by the central node from the AAA server as described above.

S1104: An SDN controller obtains the ID of the Remote AN or the ID of the Virtual AN and the information about the port by using which the Remote AN accesses the central node or the information about the virtual port of the Virtual AN that are carried in the OpenFlow message.

S1105: The SDN controller initiates an AAA message, such as an Access Request message, that carries the ID of the Remote AN or the ID of the Virtual AN and the information about the port by using which the Remote AN accesses the central node or the information about the virtual port of the Virtual AN.

S1106: The AAA server performs authorization and authentication according to the ID of the Remote AN or the ID of the Virtual AN and the information about the port by using which the Remote AN accesses the central node or the information about the virtual port of the Virtual AN, and after the authentication succeeds, the AAA server delivers a file name of a corresponding configuration file and an IP address of a configuration server on which the configuration file is located.

S1107: The AAA server returns an AAA message, such as an Access Accept message, that carries the file name of the corresponding configuration file and the IP address of the configuration server.

S1108: The SDN controller obtains the DHCP DISCOVER message from the OpenFlow message in step S1103, and then forwards the DHCP DISCOVER message to a DHCP server.

S1109: The DHCP server returns a DHCP OFFER message.

S1110: The SDN controller adds the DHCP OFFER message to an OpenFlow message, and sends the OpenFlow message to the Virtual AN.

S1111: As a DHCP Client, the Virtual AN initiates a DHCP REQUEST message, where a client hardware address in the message is set to the MAC address of the Remote AN; and adds the DHCP message to an OpenFlow message.

Optionally, the message may further carry the ID of the Remote AN or the ID of the Virtual AN and the information about the port by using which the Remote AN accesses the central node or the information about the virtual port of the Virtual AN.

S1112: The SDN controller obtains the DHCP REQUEST message from the OpenFlow message, and then forwards the DHCP REQUEST message to the DHCP server.

S1113: The DHCP server assigns a management IP address to the Virtual AN, and returns a DHCP ACK message carrying the management IP address.

S1114: The SDN controller obtains the management IP address of the Virtual AN from the DHCP ACK message returned by the DHCP server, and extends the DHCP ACK to carry the file name of the corresponding configuration file and the IP address of the configuration server.

S1115: The SDN controller adds the DHCP ACK message to an OpenFlow message and sends the OpenFlow message to the Virtual AN, where the OpenFlow message carries the DHCP ACK and the ID of the Remote AN/the ID of the Virtual AN.

S1116: The SDN controller stores the ID of the Virtual AN obtained in step S1104 and the corresponding management IP address of the Virtual AN obtained in step S1114 in the following Virtual AN address table shown in Table 4, for use when a message sent by another device on a communications network to the Virtual AN is forwarded.

In this way, the Virtual AN ID of the Virtual AN corresponds to the management IP address of the Virtual AN. When the Remote AN runs normally, the Virtual AN instead of the Remote AN is seen on the side of an NMS or OSS of the operator, the Remote AN is masked for the NMS or OSS, and the NMS or OSS only needs to communicate with the Virtual AN, and does not need to consider the Remote AN connected to the Virtual AN. In an optional implementation manner, the ID of the Virtual AN may be the same as the ID of the Remote AN because the Virtual AN is in a one-to-one correspondence with the Remote AN in this embodiment. In this case, the management IP address corresponding to the ID of the Virtual AN may also be considered as a management IP address corresponding to the ID of the corresponding Remote AN.

TABLE 4

Virtual AN address table

| ID of Virtual AN | Management IP address |
|---|---|
| 1 | 100.11.1.0 |
| ... | |

S1117: The Virtual AN obtains the ID of the Remote AN or the ID of the Virtual AN, the file name of the configuration file, and the IP address of the configuration server that are carried in the OpenFlow message, and obtains the assigned management IP address from the DHCP ACK message.

S1118: The Virtual AN forms the Virtual AN information table shown in Table 1 according to the ID of the Remote AN or the ID of the Virtual AN.

The embodiment shown in FIG. 12 provides a second example of obtaining a management IP address and file information of a configuration file of a remote access node by a virtual access node. In this example, the virtual access node performs communication by using an IP Edge, and one virtual access node corresponds to one remote access node.

A procedure of the embodiment shown in FIG. 12 is similar to the procedure of the embodiment shown in FIG. 11. A main difference lies in that a DHCP message does not need to be transmitted by using an OpenFlow message, and all information such as the ID of the Remote AN and the ID of the Virtual AN is carried in the DHCP message instead of the OpenFlow message.

The embodiment shown in FIG. 12 includes the following steps.

S1201: Set a Remote AN/Virtual AN information table shown in Table 3 on an AAA server.

S1202: As a DHCP Client, a Virtual AN initiates a DHCP DISCOVER message, where a client hardware address in the message is set to a MAC address of a Remote AN.

S1203: The Virtual AN adds an ID of the Remote AN or an ID of the Virtual AN and information about a port by using which the Remote AN accesses a central node or information about a virtual port of the Virtual AN to an extended DHCP DISCOVER message, and sends the extended DHCP DISCOVER message to an IP Edge.

S1204: The IP Edge obtains the ID of the Remote AN or the ID of the Virtual AN and the information about the port by using which the Remote AN accesses the central node or the information about the virtual port of the Virtual AN that are carried in the DHCP DISCOVER message, and then initiates an AAA message such as an Access Request message.

S1205: The IP Edge adds the ID of the Remote AN or the ID of the Virtual AN and the information about the port by using which the Remote AN accesses the central node or the information about the virtual port of the Virtual AN to an AAA message.

S1206: The AAA server performs authorization and authentication according to the ID of the Remote AN or the ID of the Virtual AN and the information about the port by using which the Remote AN accesses the central node or the information about the virtual port of the Virtual AN, and after the authentication succeeds, the AAA server delivers a file name of a configuration file of the Remote AN and an IP address of a configuration server on which the configuration file is located.

S1207: The AAA server returns an AAA message, such as an Access Accept message, that carries the file name of the corresponding configuration file and the IP address of the configuration server.

S1208: The IP Edge forwards the DHCP DISCOVER message in step S1203 to a DHCP server.

S1209: The DHCP server returns a DHCP OFFER message.

S1210: The IP Edge sends the DHCP OFFER message to the Virtual AN.

S1211: As a DHCP Client, the Virtual AN initiates a DHCP REQUEST message, where a client hardware address in the message is set to the MAC address of the Remote AN, and the DHCP REQUEST message carries the ID of the Remote AN or the ID of the Virtual AN and the information about the port by using which the Remote AN accesses the central node or the information about the virtual port of the Virtual AN.

S1212: The IP Edge forwards the received DHCP REQUEST message to the DHCP server.

S1213: The DHCP server assigns a management IP address to the Virtual AN, and returns a DHCP ACK message carrying the management IP address.

S1214: The IP Edge obtains the management IP address of the Virtual AN from the DHCP ACK message returned by the DHCP server, and extends the DHCP ACK to carry the file name of the corresponding configuration file and the IP address of the configuration server.

S1215: The IP Edge sends the extended DHCP ACK message to the Virtual AN, where the message carries the file name of the corresponding configuration file, the IP address of the configuration server, the management IP address of the Virtual AN, and the ID of the Remote AN or the ID of the Virtual AN.

S1216: The IP Edge stores the ID of the Virtual AN obtained in step S1204 and the corresponding management IP address of the Virtual AN obtained in step S1214 in the Virtual AN address table shown in Table 4, for use when a message sent by another device on a communications network to the Virtual AN is forwarded.

S1217: The Virtual AN obtains the management IP address, the file name of the corresponding configuration file, and the IP address of the configuration server according to the ID of the Remote AN or the ID of the Virtual AN.

S1218: The Virtual AN forms the Virtual AN information table shown in Table 1 according to the ID of the Remote AN or the ID of the Virtual AN.

The embodiment shown in FIG. 13A and FIG. 13B provides a third example of obtaining a management IP address and file information of a configuration file of a remote access node by a virtual access node. In this example, the virtual access node performs communication by using an SDN controller, and one virtual access node corresponds to multiple remote access nodes.

The embodiment shown in FIG. 13A and FIG. 13B includes the following steps:

S1301: Set a Remote AN/Virtual AN information table shown in Table 5 on an AAA server. Compared with Table 3, in Table 5, the column "ID of Virtual AN" is mandatory, the column "ID of Remote AN" is optional, and both the column "ID of Remote AN" and the column "ID of Virtual AN" may exist in Table 5 to facilitate management. In a specific implementation, a file name of a configuration file and an IP address of a configuration server in Table 5 may be replaced with a URI corresponding to the configuration file.

TABLE 5

Remote AN/Virtual AN information table

| ID of Remote AN | Information about port by using which a Remote AN accesses a central node or information about virtual port of Virtual AN | ID of Virtual AN | File name of configuration file | IP address of configuration server |
|---|---|---|---|---|
| OLT ID1 | slot (slot) number 1 and port (port) number 1 | 1 | A | 10.71.47.175 |
| OLT ID2 | slot (slot) number 2 and port (port) number 2 | 1 | B | 100.10.2.3 |
| ... | | | | |

Steps S1302 to S1305 are similar to steps S1102 to S1105 in FIG. 11.

S1306: The AAA server performs authorization and authentication according to the ID of the Remote AN or the ID of the Virtual AN and the information about the port by using which the Remote AN accesses the central node or the information about the virtual port of the Virtual AN, and after the authentication succeeds, the AAA server delivers the ID of the Virtual AN, the ID of the Remote AN or the information about the virtual port of the Virtual AN, a file name of a corresponding configuration file, and an IP address of a configuration server on which the configuration file is located.

S1307: The AAA server returns an AAA message, such as an Access Accept message, that carries the ID of the Virtual AN, the ID of the Remote AN or the information about the virtual port of the Virtual AN, the file name of the configuration file of the Remote AN, and the IP address of the configuration server.

S1308: The SDN controller obtains the ID of the Virtual AN that is carried in the AAA message, and searches, according to the ID of the Virtual AN, a Virtual AN address table shown in Table 6 stored in the SDN controller, to determine whether a management IP address has been assigned to the Virtual AN; if yes, perform step S1309; otherwise, perform step S1310.

TABLE 6

Virtual AN address table

| ID of Virtual AN | Management IP address | ID of Remote AN, optional |
|---|---|---|
| 1 | 100.11.1.0 | one or more |
| ... | | |

S1309: The SDN controller obtains a management IP address of the Virtual AN by searching, according to the ID of the Virtual AN, the Virtual AN address table stored in the SDN controller, and directly generates a DHCP Offer according to the address, where the DHCP Offer carries the address.

Steps S1310 and S1311 are similar to steps S1108 and S1109 in FIG. 11.

S1312: The SDN controller sends the DHCP OFFER message.

S1313: The SDN controller adds the DHCP OFFER message to an OpenFlow message and sends the OpenFlow message to the Virtual AN. Optionally, the OpenFlow message carries the ID of the Remote AN/the ID of the Virtual AN.

S1314: As a DHCP Client, the Virtual AN initiates a DHCP REQUEST message, and directly adds the DHCP message to an OpenFlow message. The OpenFlow message carries the DHCP REQUEST. Optionally, the OpenFlow message carries the ID of the Remote AN or the ID of the Virtual AN.

S1315: Determine, according to an execution result in step S1308, whether a management IP address has been assigned; if yes, perform step S1318; otherwise, perform step S1316.

Steps S1316 and S1317 are similar to steps S1112 and S1113 in FIG. 11.

S1318: Directly generate a DHCP ACK according to the management IP address found in step S1308, where the DHCP ACK carries the address.

Step S1319 is similar to step S1114 in FIG. 11.

S1320: The SDN controller adds the DHCP ACK message to an OpenFlow message and sends the OpenFlow message to the Virtual AN. The OpenFlow message carries the DHCP ACK message, the ID of the Virtual AN, and the ID of the Remote AN or the information about the virtual port of the Virtual AN.

S1321: The SDN controller stores the management IP address corresponding to the ID of the Virtual AN, as shown in Table 6.

S1322: The Virtual AN obtains the ID of the Virtual AN, the ID of the Remote AN or the information about the virtual port of the Virtual AN, the management IP address corresponding to the ID of the Virtual AN, the IP address of the configuration server on which the configuration file is located, and the file name of the configuration file that are carried in the OpenFlow message, and obtains the assigned management IP address from the DHCP ACK message.

S1323: Form the Virtual AN information table shown in Table 2 according to the ID of the Virtual AN.

The embodiment shown in FIG. 14A and FIG. 14B provides a fourth example of obtaining a management IP address and file information of a configuration file of a remote access node by a virtual access node. In this example, the virtual access node performs communication by using an IP Edge, and one virtual access node corresponds to multiple remote access nodes.

A main difference between the embodiment shown in FIG. 14A and FIG. 14B and the embodiment shown in FIG. 13A and FIG. 13B lies in that a DHCP message does not need to be transmitted by using an OpenFlow message, and all information such as the ID of the Virtual AN and the ID of the Remote AN is carried in the DHCP message instead of the OpenFlow message.

The embodiment shown in FIG. 14A and FIG. 14B includes the following steps:

S1401: Set a Remote AN information table shown in Table 5 on an AAA server.

S1402: As a DHCP Client, a Virtual AN initiates a DHCP DISCOVER message, where a client hardware address in the message is set to a MAC address of a Remote AN.

S1403: The Virtual AN extends the DHCP DISCOVER message to carry an ID of the Remote AN or an ID of the Virtual AN and information about a port by using which the Remote AN accesses a central node or information about a virtual port of the Virtual AN to the message, and sends the extended DHCP DISCOVER message to an IP Edge.

S1404: The IP Edge obtains the ID of the Remote AN or the ID of the Virtual AN and the information about the port by using which the Remote AN accesses the central node or the information about the virtual port of the Virtual AN that are carried in the DHCP DISCOVER message, and initiates an AAA message such as an Access Request message.

S1405: The IP Edge adds the ID of the Remote AN or the ID of the Virtual AN and the information about the port by using which the Remote AN accesses the central node or the information about the virtual port of the Virtual AN to an AAA message.

S1406: The AAA server performs authorization and authentication according to the ID of the Remote AN or the ID of the Virtual AN and the information about the port by using which the Remote AN accesses the central node or the information about the virtual port of the Virtual AN, and after the authentication succeeds, the AAA server delivers the ID of the corresponding Virtual AN, the ID of the Remote AN or the information about the virtual port of the Virtual AN, a file name of a configuration file, and an IP address of a configuration server on which the configuration file is located.

S1407: The AAA server returns an AAA message, such as an Access Accept message, that carries the ID of the Virtual AN, the ID of the Remote AN or the information about the virtual port of the Virtual AN, the file name of the configuration file corresponding to the Remote AN, and the IP address of the configuration server.

S1408: The IP Edge obtains the ID of the Virtual AN that is carried in the AAA message, and searches, according to the ID of the Virtual AN, the Virtual AN address table shown in Table 6 stored in the IP Edge, to determine whether a management IP address has been assigned to the Virtual AN; if yes, perform step S1409; otherwise, perform step S1410.

S1409: The IP Edge obtains a management IP address of the Virtual AN by searching, according to the ID of the Virtual AN, the Virtual AN address table stored in the IP Edge, and directly generates a DHCP OFFER according to the address, where the DHCP OFFER carries the address.

Steps S1410 and S1411 are similar to steps S1108 and S1109 in FIG. 11.

S1412: The IP Edge sends the DHCP OFFER message.

S1413: The IP Edge initiates the DHCP OFFER.

S1414: As a DHCP client, the Virtual AN initiates a DHCP REQUEST message, where the message carries the ID of the Remote AN or the ID of the Virtual AN.

S1415: Determine, according to an execution result in step S1408, whether a management IP address has been assigned; if yes, perform step S1418; otherwise, perform step S1416.

Steps S1416 and S1417 are similar to steps S1112 and S1113 in FIG. 11.

S1418: Directly generate a DHCP ACK according to the management IP address found in step S1409, where the DHCP ACK carries the address.

S1419: Extend the DHCP ACK to carry the file name of the configuration file and the IP address of the configuration server.

S1420: The IP Edge sends the DHCP ACK to the Virtual AN, where the DHCP ACK carries the ID of the Virtual AN, the ID of the Remote AN or the information about the virtual port of the Virtual AN, the file name of the configuration file, the IP address of the configuration server, and the management IP address of the Virtual AN.

S1421: The IP Edge stores the management IP address corresponding to the ID of the Virtual AN, as shown in Table 6.

S1422: The Virtual AN obtains the ID of the Virtual AN, the ID of the Remote AN or the information about the virtual port of the Virtual AN, the management IP address corresponding to the ID of the Virtual AN, the file name of the configuration file of the Remote AN, and the IP address of the configuration server on which the configuration file is located.

S1423: Form the Virtual AN information table shown in Table 2 according to the ID of the Virtual AN and the ID of the Remote AN or the information about the virtual port of the Virtual AN.

A procedure of configuring a forwarding table is described in the embodiment shown in FIG. 15. After obtaining a management IP address and a file name of a configuration file, a Virtual AN may perform the procedure of configuring a Virtual AN forwarding table shown in FIG. 15. Herein, an OSS or an NMS may trigger an IP Edge or an SDN controller to configure a forwarding table, or a Virtual AN may initiate a forwarding table configuration request to an IP Edge or an SDN controller to trigger configuration of a forwarding table.

The procedure of configuring a forwarding table may include the following steps.

S1501: An IP Edge or an SDN controller obtains forwarding table information corresponding to a Virtual AN by using the Simple Network Management Protocol (SNMP) or the Network Configuration Protocol (Netconf).

S1502: The IP Edge or the SDN controller initiates delivery of a forwarding table after obtaining a management IP address of the Virtual AN from a Virtual AN address table, such as Table 6, stored in the IP Edge or the SDN controller.

S1503: The IP Edge or the SDN controller delivers the forwarding table to the Virtual AN by using an OpenFlow message.

A destination address of the message is the management IP address of the Virtual AN, and a source address of the message is an IP address of the SDN controller or the IP Edge.

S1504: The Virtual AN searches a Virtual AN information table such as Table 1 or Table 2, to obtain MAC addresses or IDs of one or more Remote ANs.

S1505: The Virtual AN converts a forwarding table delivering protocol that is based on an upper-layer protocol such as an OpenFlow protocol to a forwarding table delivering protocol that is based on a data link layer protocol such as an OMCI, Ethernet management channel, or ETH OAM protocol. When one Virtual AN corresponds to multiple Remote ANs, the Virtual AN needs to split forwarding table information corresponding to the Virtual AN into forwarding table information of the multiple Remote ANs.

The Virtual AN delivers one or more forwarding tables to one or more Remote ANs based on the data link layer protocol, where a source address of the message is a MAC address of the Virtual AN, and a destination address of the message is a MAC address of a Remote AN. If the Remote AN is an ONU or an ONT, an ID of the ONU needs to be set to an ID of the Remote AN, and the ID of the ONU is then added to a PON frame.

S1506: The Remote AN configures a Remote AN forwarding table according to the received forwarding table information.

The embodiments are described in detail above by using the embodiments. In one aspect, according to the information processing method and the network node provided in the embodiments, after receiving a go-online notification indicating that a first access node goes online, a central node obtains configuration information of the first access node, and sends the obtained configuration information to the first access node. In this way, after receiving the configuration information, the first access node can run after performing configuration according to the configuration information. This implements plug-and-play of the first access node, and the first access node does not need to be manually configured before accessing a network, thereby reducing device management complexity of the first access node. The first access node may be an access node of any type including a remote access node.

In another aspect, according to the authentication method and the authentication server provided in the embodiments, after receiving an authentication request that requests to perform authentication on whether a first access node is a legal node, an authentication server performs authentication on whether the first access node is a legal node, and after determining that the first access node is a legal node, the authentication server sends an authentication response indicating that the first access node is a legal node. In the authentication method, authentication is performed on a node device on a communications network, thereby preventing an invalid node from accessing the communications network.

Persons skilled in the art should understand that the embodiments may be provided as a method, a system, or a computer program product. Therefore, the present embodiments may use a form of hardware only embodiments, software only embodiments, or embodiments with a combination of software and hardware. Moreover, the present embodiments may use a form of a computer program product that is implemented on one or more computer-usable storage media (including but not limited to a disk memory, a CD-ROM, an optical memory, and the like) that include computer-usable program code.

The present embodiments are described with reference to the flowcharts and/or block diagrams of the method, the device, system, and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments have been described, persons skilled in the art can make changes and modifications to these embodiments once they learn the basic inventive concept. Therefore, the following claims are intended to be construed as to cover the preferred embodiments and all changes and modifications falling within the scope.

Obviously, persons skilled in the art can make various modifications and variations to the present embodiments without departing from the spirit and scope of the present embodiments. The embodiments are intended to cover these modifications and variations provided that they fall within the scope of protection defined by the following claims and their equivalent technologies.

What is claimed is:

1. An information processing method, the method comprising:
   receiving, by a central node, a go-online notification sent by a first access node, wherein the go-online notification is sent when a communication connection is established between the first access node and a virtual access node, and wherein the first access node is mapped to the virtual access node, and each port of the first access node corresponds to a virtual port of the virtual access node;
   determining, by the central node, that the first access node goes online according to the go-online notification sent by the first access node;
   transmitting, by the central node, a request that comprises an identification of the virtual access node to a configuration server;
   receiving from the configuration server, by the central node, configuration information related to the first access node; and
   after the first access node goes online, sending, by the virtual access node, the configuration information related to the first access node to the first access node.

2. The method according to claim 1, wherein the go-online notification is based on a first protocol, and wherein the configuration information related to the first access node is sent by the virtual access node to the first access node based on the first protocol, and the first protocol comprises a physical layer protocol, a data link layer protocol, or an IP layer protocol.

3. The method according to claim 2, wherein a first format of the configuration information related to the first access node that is obtained by the virtual access node conforms to a requirement of the IP layer protocol or conforms to a requirement of a protocol of a layer that is higher than an IP layer in an Open System Interconnection, OSI, model.

4. The method according to claim 3, wherein sending the configuration information related to the first access node to the first access node comprises:
  converting the first format of the configuration information related to the first access node that is obtained by the virtual access node to a second format that conforms to a requirement of the first protocol; and
  sending, to the first access node, the configuration information related to the first access node that is in the second format.

5. The method according to claim 1, wherein before sending the configuration information related to the first access node to the first access node, the method further comprises:
  sending, by the virtual access node, an authentication request for the first access node to an authentication server; and
  receiving, by the virtual access node, an authentication response indicating that the first access node is a legal node.

6. An information processing method, the method comprising:
  receiving, by a central node, a go-online notification sent by a first access node, wherein the go-online notification is sent when the first access node is already powered on, and wherein the first access node is mapped to the virtual access node, and each port of the first access node corresponds to a virtual port of the virtual access node;
  determining, by the central node, that the first access node goes online according to the go-online notification sent by the first access node;
  transmitting, by the central node, a request that comprises an identification of the virtual access node to a configuration server;
  receiving from the configuration server, by the central node, configuration information related to the first access node; and
  after the first access node goes online, sending, by the virtual access node, the configuration information related to the first access node to the first access node.

7. The method according to claim 6, wherein the go-online notification is based on a first protocol, and wherein the configuration information related to the first access node is sent by the virtual access node to the first access node based on the first protocol, and the first protocol comprises a physical layer protocol, a data link layer protocol, or an IP layer protocol.

8. The method according to claim 7, wherein a first format of the configuration information related to the first access node that is obtained by the virtual access node conforms to a requirement of the IP layer protocol or conforms to a requirement of a protocol of a layer that is higher than an IP layer in an Open System Interconnection, OSI, model.

9. The method according to claim 8, wherein sending the configuration information related to the first access node to the first access node comprises:
  converting the first format of the configuration information related to the first access node that is obtained by the virtual access node to a second format that conforms to a requirement of the first protocol; and
  sending, to the first access node, the configuration information related to the first access node that is in the second format.

10. The method according to claim 6, wherein before sending the configuration information related to the first access node to the first access node, the method further comprises:
  sending, by the virtual access node, an authentication request for the first access node to an authentication server; and
  receiving, by the virtual access node, an authentication response indicating that the first access node is a legal node.

11. A network node comprising:
  a processor; and
  a non-transitory computer readable storage medium storing a program for execution by the processor, the program including instructions to:
    receive a go-online notification sent by a first access node, wherein the go-online notification is sent when a communication connection is established between the first access node and a virtual access node, or the go-online notification is sent when the first access node is already powered on and determine that the first access node goes online according to the go-online notification sent by the first access node; the first access node is mapped to the virtual access node, and each port of the first access node corresponds to a virtual port of the virtual access node;
    transmit a request that comprises an identification of the virtual access node to a configuration server;
    receive configuration information related to the first access node from the configuration server; and
    send the configuration information related to the first access node to the first access node.

12. The network node according to claim 11, wherein the go-online notification is based on a first protocol, the virtual access node is configured to send the configuration information related to the first access node to the first access node based on the first protocol, and the first protocol comprises a physical layer protocol, a data link layer protocol, or an IP layer protocol.

13. The network node according to claim 12, wherein a first format of the configuration information related to the first access node that is obtained by the virtual access node conforms to a requirement of the IP layer protocol or conforms to a requirement of a protocol of a layer that is higher than an IP layer in an Open System Interconnection, OSI, model.

14. The network node according to claim 13, wherein instructions further comprise instructions to
  convert the first format of the configuration information related to the first access node that is obtained by the virtual access node to a second format that conforms to a requirement of the first protocol; and
  send, to the first access node, the configuration information related to the first access node that is in the second format.

15. The network node according to claim 11, wherein instructions further comprise instructions to determine the virtual access node in at least one virtual access node established on the network node in advance.

16. The network node according to claim 11, wherein instructions further comprise instructions to establish the virtual access node.

17. The network node according to claim 11, wherein instructions further comprise instructions to
  before sending the configuration information related to the first access node to the first access node, send an authentication request for the first access node to an authentication server, and receive an authentication response indicating that the first access node is a legal node.

\* \* \* \* \*